United States Patent
Hosoda

(10) Patent No.: US 8,248,635 B2
(45) Date of Patent: Aug. 21, 2012

(54) IMAGE EDITING APPARATUS, IMAGE EDITING METHOD, IMAGE PROCESSING APPARATUS, AND METHOD FOR CONTROLLING IMAGE PROCESSING APPARATUS

(75) Inventor: Osamu Hosoda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1096 days.

(21) Appl. No.: 11/300,141

(22) Filed: Dec. 14, 2005

(65) Prior Publication Data

US 2006/0132858 A1 Jun. 22, 2006

(30) Foreign Application Priority Data

Dec. 20, 2004 (JP) ................................. 2004-367837
Oct. 14, 2005 (JP) ................................. 2005-300355

(51) Int. Cl.
G06F 3/12 (2006.01)
H04N 1/387 (2006.01)
(52) U.S. Cl. ....................................... 358/1.15; 358/452
(58) Field of Classification Search .................. None
See application file for complete search history.

(56) References Cited

U.S. PATENT DOCUMENTS

| | | | | |
|---|---|---|---|---|
| 5,436,734 A * | 7/1995 | Yamauchi et al. | ............ | 358/448 |
| 5,548,708 A | 8/1996 | Sakashita et al. | | |
| 5,854,693 A * | 12/1998 | Yoshiura et al. | ............... | 358/468 |
| 6,069,706 A * | 5/2000 | Kajita et al. | .................. | 358/1.15 |
| 6,392,758 B2 * | 5/2002 | Hines | | |
| 6,567,177 B2 * | 5/2003 | Matsuyama | ................. | 358/1.14 |
| 7,164,486 B1 * | 1/2007 | Nakamura et al. | ........... | 358/1.15 |
| 2005/0073715 A1 * | 4/2005 | Sakai et al. | .................. | 358/1.15 |

FOREIGN PATENT DOCUMENTS

JP 5-324790 A 12/1993

* cited by examiner

*Primary Examiner* — Marivelisse Santiago Cordero
*Assistant Examiner* — Mesfin Getaneh
(74) *Attorney, Agent, or Firm* — Canon USA Inc. IP Division

(57) ABSTRACT

An image editing apparatus capable of executing an image editing process on image data input from an external apparatus and transmitting edited image data to the external apparatus is provided. The image editing apparatus includes an input unit adapted to input a command of an image editing process to be executed on image data; a determining unit adapted to determine whether the image editing process is to be executed on the image data based on the type of the image editing process specified by the input unit; a generating unit adapted to generate type information indicating the type of the specified image editing process if the determining unit determines that the image editing process specified by the input unit is not to be executed on the image data; and a transmitting unit adapted to transmit the type information generated by the generating unit to the external apparatus.

12 Claims, 16 Drawing Sheets

FIG. 10

| | Image processing apparatus ~10002 | Image editing apparatus ~10003 |
|---|---|---|
| ~10001 | | |
| Skew correction | inexecutable | executable |
| Removal of isolated point | inexecutable | executable |
| Selection and erasing of block | inexecutable | executable |
| Show-through effect correction | executable | executable |
| Two-sided printing | executable | executable |
| Scale-up | executable | executable |
| Scale-down | executable | executable |
| Removal of punched hole | inexecutable | executable |
| Frame erasing | executable | executable |

10000 IMAGE PROCESSING FUNCTION LIST

IMAGE EDITING APPARATUS, IMAGE EDITING METHOD, IMAGE PROCESSING APPARATUS, AND METHOD FOR CONTROLLING IMAGE PROCESSING APPARATUS

BACKGROUND OF THE INVENTION

1. Field of the Invention

The present invention relates to an image editing apparatus, an image editing method, an image processing apparatus, and a method for controlling the image processing apparatus, for editing image data obtained by reading a document.

2. Description of the Related Art

Recently, a system of transmitting image data read by an image reader provided in an image processing apparatus to an image editing apparatus and editing the image data in the image editing apparatus has been constructed. In such a system, a work flow of transmitting the image data edited by the image editing apparatus to the image processing apparatus and printing the image data on a physical medium such as paper is executed.

Examples of an image editing process include an imposing function of laying out image data of two pages on one sheet of paper, resizing, and color correction. Other examples include correction of defective conditions, such as removal of an incorrect rendering portion caused by dust or the like that is mixed when an image reader reads a document and skew correction performed when a document is skewed while the image reader reads the document.

Japanese Patent Laid-Open No. 5-324790 discloses a process of storing image data read by a reader (image reader) in a database of an image editing apparatus and editing the stored image data to generate new image data. In Japanese Patent Laid-Open No. 5-324790, image data to be stored in the database of the image editing apparatus is gradually sized down (the resolution thereof is lowered) and then the image data is encoded. In order to edit the image data, the sized-down encoded image data is decoded and the decoded low-resolution image data is edited. Accordingly, a high-speed process or display can be realized.

In a known method, when image data obtained by reading a document in an image reader should be edited and printed, the image data is transmitted to an image editing apparatus. In this case, the image data itself obtained by reading is transmitted regardless of the type of image editing function applied to the image data. Further, edited image data needs to be transmitted to an image processing apparatus such as a printer so as to be printed. In such a configuration, a network traffic jam is more likely to occur as the amount of image data increases, which causes inhibition of high-rate data transmission.

The above-described known art suggests a solution of converting image data to be edited in the image editing apparatus to low-resolution data and encoding it and then storing the encoded data in the database. However, this known art is applied to the control within the image editing apparatus, and a system including an image editing apparatus, an image reader, and an image processing apparatus connected through a network is not taken into consideration. Further, the throughput is estimated to decrease as the amount of data to be dealt with increases. Therefore, this known art is not a fundamental solution.

The image data read by the image reader has a data format that can be processed in the image processing apparatus. Typically, a data format appropriate for data processing or handling in the image processing apparatus is selected. The selected data format is not predicated on being edited in an external editing apparatus. Therefore, the image data needs to be converted to another data format in order to edit the image data in an external image editing apparatus. As a result, much time is taken to convert the data format and the throughput of the entire system degrades disadvantageously. In the above-described known art, hierarchical low-resolution image data is generated by repeating size-down and encoding in stages, but the difference in data format is not at all considered.

Further, in Japanese Patent Laid-Open No. 5-324790, image data is converted to low-resolution image data. In this method, the quality of the image data degrades even if a high-resolution image or a high-resolution image reader is used, which is not suitable for a user who requires high-quality image processing. Particularly, in a field of print on demand (POD), degradation of image quality needs to be prevented because printed matter as a product is produced in this field.

SUMMARY OF THE INVENTION

According to a first aspect of the present invention, there is provided an image editing apparatus capable of executing an image editing process on image data input from an external apparatus and transmitting edited image data to the external apparatus. The image editing apparatus includes: an input unit adapted to input a command of an image editing process to be executed on the image data; a determining unit adapted to determine whether the image editing process is to be executed on the image data based on the type of the image editing process specified by the input unit; a generating unit adapted to generate type information indicating the type of the specified image editing process if the determining unit determines that the image editing process specified by the input unit is not to be executed on the image data; and a transmitting unit adapted to transmit the type information generated by the generating unit to the external apparatus.

According to a second aspect of the present invention, there is provided an image processing apparatus that transmits image data obtained by reading a document in a document reader to an image editing apparatus and that outputs print data received from the image editing apparatus. The image processing apparatus includes: a storage unit adapted to store image data obtained by reading a document in the document reader; a transmitting unit adapted to transmit the image data to the image editing apparatus; a receiving unit adapted to receive print data from the image editing apparatus; and an image editing unit adapted to obtain image data stored in the storage unit if the print data received by the receiving unit includes type information indicating the type of image editing process and to execute the image editing process specified by the type information.

According to a third aspect of the present invention, there is provided an image editing apparatus capable of executing an image editing process on image data input from an external apparatus and transmitting edited image data to the external apparatus. The image editing apparatus includes: an edit determining unit adapted to determine whether the image data input from the external apparatus should be edited in the image editing apparatus; and an editing unit adapted to obtain type information indicating the type of image editing process attached to the image data and to execute an image editing process on the image data based on the type information if the edit determining unit determines that the image data should be edited in the image editing apparatus.

According to a fourth aspect of the present invention, there is provided an image processing apparatus that transmits image data obtained by reading a document in a document reader to an image editing apparatus and that outputs print data transmitted from the image editing apparatus. The image processing apparatus includes: an input unit adapted to input a command of an image editing process to be executed on image data obtained by reading a document in the document reader; a determining unit adapted to determine whether the image editing process is to be executed on the image data based on the type of the image editing process specified by the input unit; a processing unit adapted to execute the specified image editing process on the image data if the determining unit determines that the image editing process specified by the input unit is to be executed on the image data and to generate type information indicating the type of the image editing process if the determining unit determines that the image editing process is not to be executed; a resolution converting unit adapted to convert the image data edited by the processing unit to low-resolution image data; and a transmitting unit adapted to transmit the image data to the image editing apparatus. The transmitting unit is adapted to transmit the low-resolution image data converted by the resolution converting unit if the image data has been edited by the processing unit and to transmit the type information generated by the processing unit and the image data whose resolution is not converted if the image data has not been edited by the processing unit.

Other features of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a function list table storing image editing function information.

DESCRIPTION OF THE EMBODIMENTS

<First Embodiment>

Figure 1:
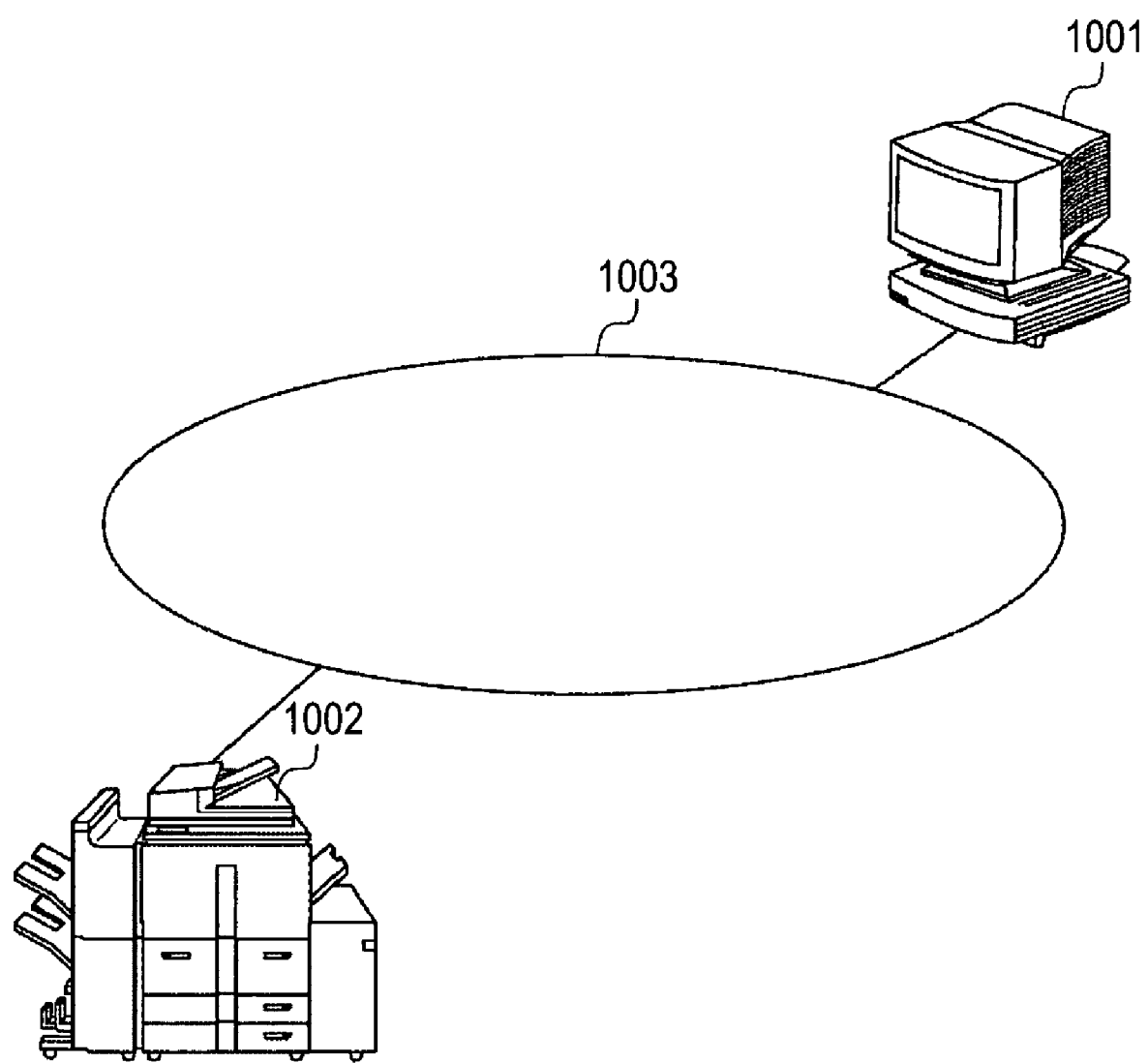
FIG. 1 shows the configuration of an exemplary image processing system.

FIG. 1 shows the configuration of an exemplary image processing system according to an embodiment of the present invention. The system includes an image editing apparatus 1001 such as a computer. The image editing apparatus 1001 has an image editing function such as application software and is capable of processing or editing image data generated in an external apparatus, as well as generating an original image.

The system also includes an image processing apparatus 1002 having an image reading function (scanner unit). This image processing apparatus 1002 includes the scanner unit and a printer unit. The system further includes a communication mechanism 1003 for connecting the image editing apparatus 1001 and the image processing apparatus 1002. In the following embodiments, a network system such as a wired LAN (local area network) or a wireless LAN is used as the communication mechanism, but the present invention is not limited to these communication forms.

Figure 2:
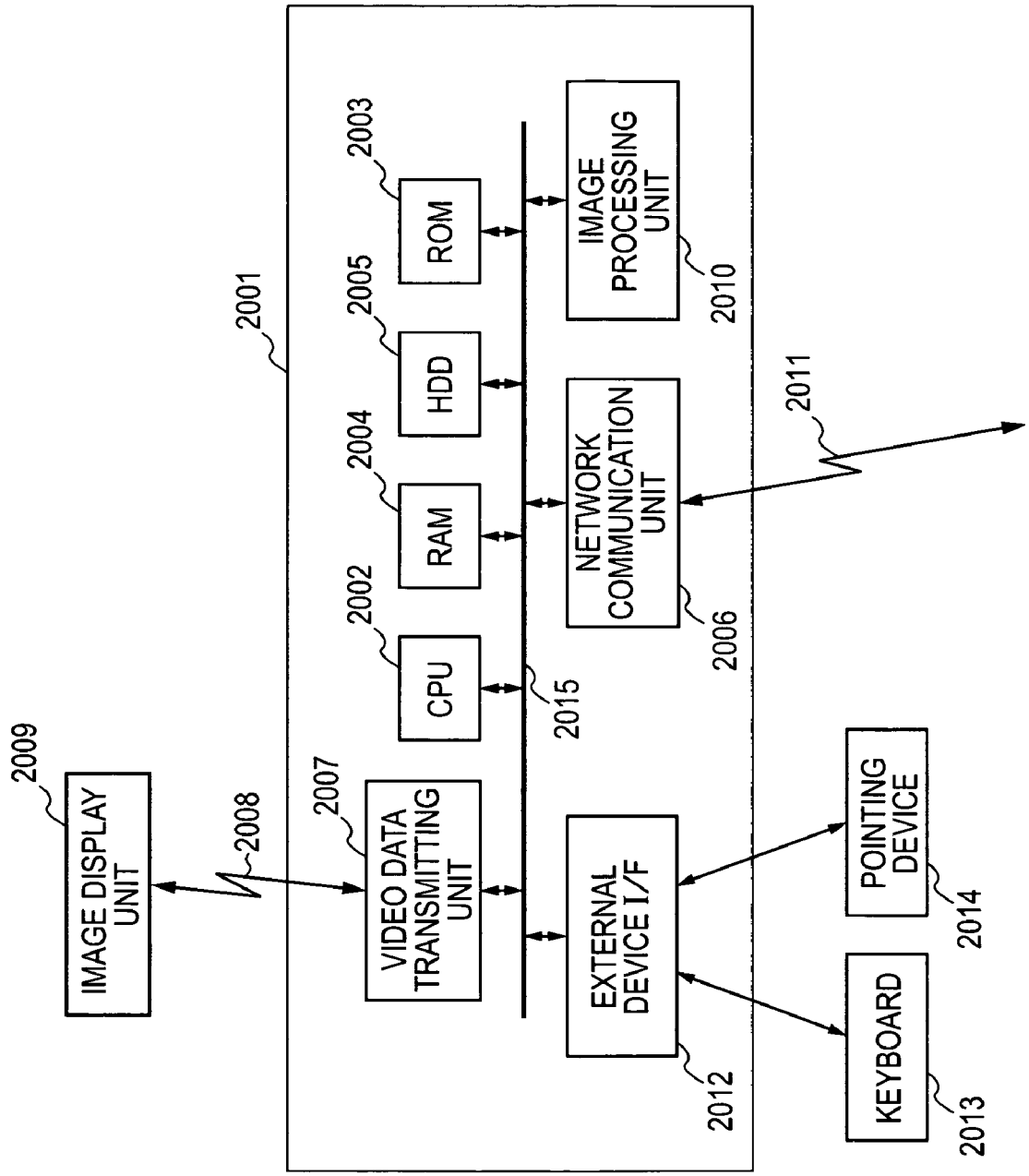
FIG. 2 is a block diagram showing the configuration of an exemplary image editing apparatus.

FIG. 2 is a block diagram showing an exemplary configuration of a main controller 2001 provided in the image editing apparatus 1001. The frame denoted by reference numeral 2001 illustrates the hardware configuration of the main controller of the image editing apparatus 1001. A CPU (central processing unit) 2002 executes a program for controlling the image editing apparatus 1001. A ROM (read only memory) 2003 stores a program for starting up the image editing apparatus 1001. A RAM (random access memory) 2004 is used to execute the program for controlling the image editing apparatus 1001. An HDD (hard disk drive) 2005 is a secondary storage device for storing program data to be expanded in the RAM 2004 so as to be operated, programs of application software, and data required by the application software.

A network communication unit 2006 performs data input/output processing with the image processing apparatus 1002. A video data transmitting unit 2007 transmits image data to an image display unit 2009 that displays images or the like formed in the image editing apparatus 1001. A communication medium, such as a cable 2008, is used to transmit image data from the video data transmitting unit 2007 to the external image display unit 2009. The image display unit 2009 displays image data received from the video data transmitting unit 2007. An image processing unit 2010 executes various image processes on bitmap image data received from the network communication unit 2006. The image processing unit 2010 has a function of digitally correcting/rendering bitmap image data. The function of digitally correcting/rendering bitmap image data is an imposing function of processing two-page bitmap image data into one-page bitmap image data, for example. This function also includes removing an incorrect rendering portion existing in bitmap image data.

The various components of the main controller 2001 communicate with each other via a bus 2015.

A network cable 2011 is used to receive image data from an external apparatus or to transmit data generated in the image editing apparatus 1001 to an external apparatus. The network cable 2011 connects to the network communication unit 2006. An external device interface (I/F) 2012 is an interface for external input/output devices. The external device I/F 2012 connects to a keyboard 2013 and a pointing device 2014. An image displayed in the image display unit 2009 can be edited by using the keyboard 2013 or the pointing device 2014.

Figure 3:
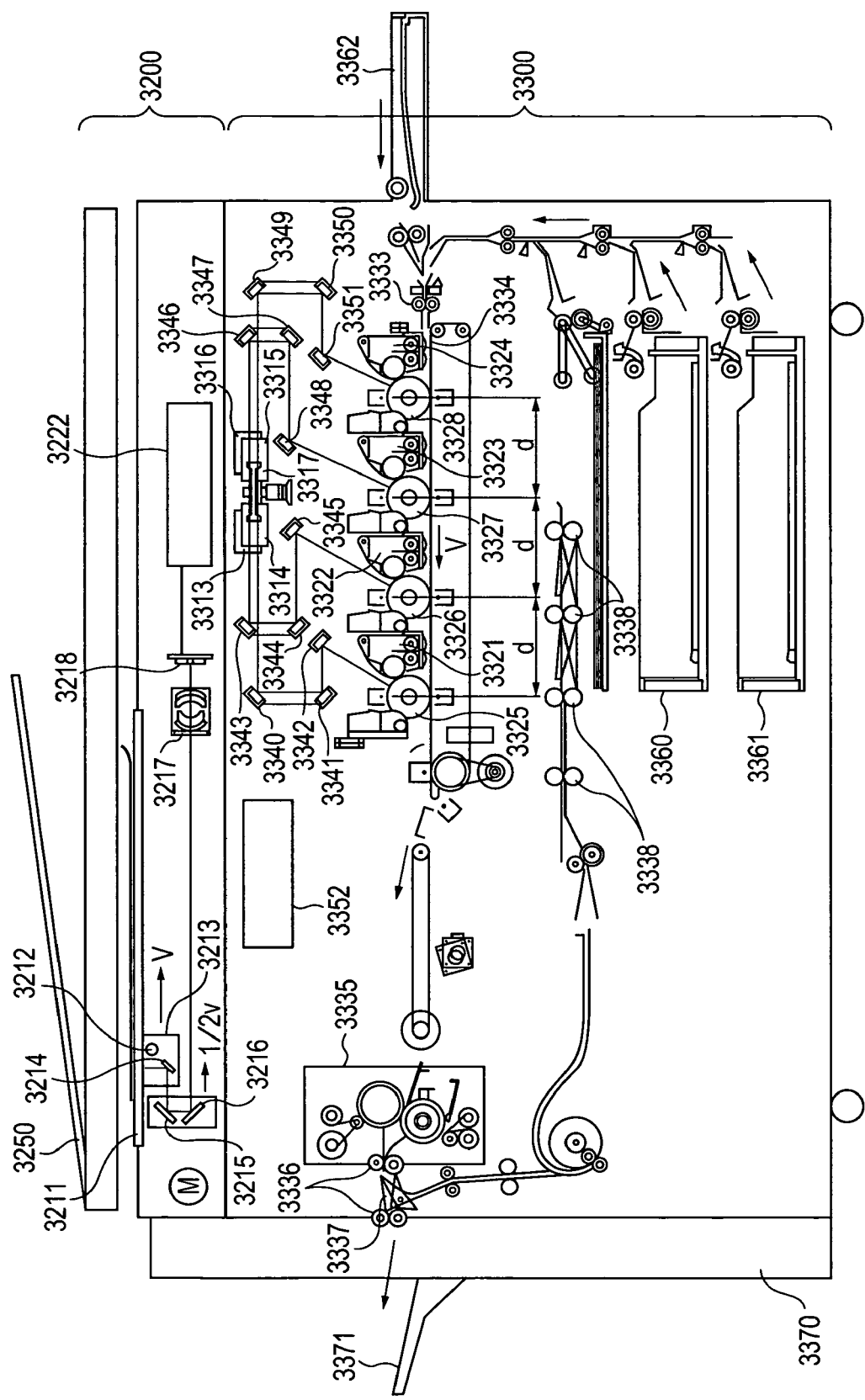
FIG. 3 is a cross-sectional view showing the configuration of an exemplary image processing apparatus.

The configuration of the image processing apparatus 1002 is described next. FIG. 3 is a cross-sectional view showing an exemplary configuration of the image processing apparatus 1002.

A document feeding unit 3250 in a scanner unit 3200 feeds sheets of a document one by one onto a platen glass 3211 and receives the sheets from the platen glass 3211 after the document has been read. When a sheet of a document is fed onto the platen glass 3211, a lamp 3212 lights up and an optical unit 3213 starts to move to scan the document by exposure. At this time, light reflected from the document is led to a CCD (charge-coupled device) image sensor (hereinafter referred to as a CCD) 3218 through mirrors 3214, 3215, and 3216 and a lens 3217. In this way, an optical signal generated by scanning the document is input to the CCD 3218 and is converted to an electric signal.

A reader image processing circuit 3222 digitally converts the electric signal output from the CCD 3218 into image data. Further, the reader image processing circuit 3222 performs a predetermined image process on the image data and outputs the image data to a main controller (not shown) through a scanner I/F (not shown). A printer image processing circuit 3352 outputs an image signal that is transmitted from the main controller through a printer I/F (not shown) to a laser driver 3317. The laser driver 3317 in a printer unit 3300 drives laser light emitters 3313, 3314, 3315, and 3316. The laser light emitters 3313, 3314, 3315, and 3316 emit laser light beams in accordance with the image data output from the printer image processing circuit 3352. The laser light beams are applied onto photoconductive drums 3325, 3326, 3327, and 3328 through mirrors 3340, 3341, 3342, 3343, 3344, 3345, 3346, 3347, 3348, 3349, 3350, and 3351. Accordingly, latent images according to the respective laser light beams are formed on the photoconductive drums 3325, 3326, 3327, and 3328. Developers 3321, 3322, 3323, and 3324 develop the latent images with black (BK), yellow (Y), cyan (C), and magenta (M) toners, respectively. The developed toners of the respective colors are transferred onto paper, so that a full-color print image is output.

Each sheet of paper is fed from any of paper cassettes 3360 and 3361 or a manual paper tray 3362 in synchronization with start of the radiation of laser light, passes through resist rollers 3333, and is absorbed onto a transfer belt 3334 so as to be carried. Then, a developing agent adhered to the photoconductive drums 3325, 3326, 3327, and 3328 is transferred onto the recording sheet. The recording sheet to which the developing agent has been transferred is carried to a fuser 3335, where the developing agent is fused on the recording sheet by heat and pressure of the fuser 3335. The recording sheet that has passed through the fuser 3335 is carried to a paper output unit 3370 by output rollers 3336. The paper output unit 3370 binds or sorts recording sheets or staples sorted recording sheets. Finally, the recording sheets are output to an output tray 3371.

When two-sided printing is set, a flapper 3337 guides the recording sheet to a re-feeding path 3338. The recording sheet guided to the re-feeding path 3338 is fed to the transfer belt 3334 at the above-described timing.

Figure 4:
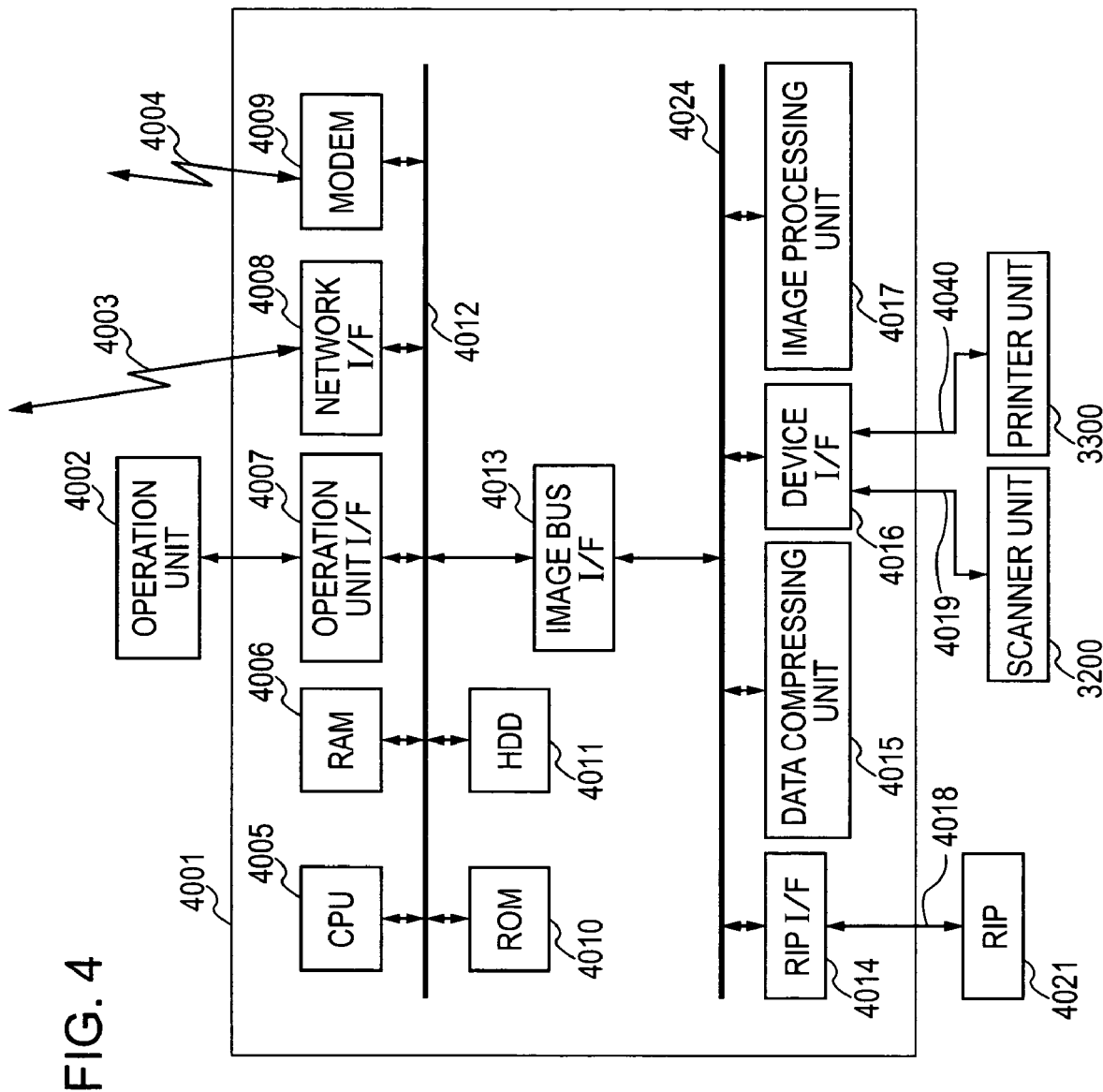
FIG. 4 is a block diagram showing the configuration of a main controller of the image processing apparatus.

FIG. 4 is a block diagram showing an exemplary configuration of a main controller 4001 that is provided in the image processing apparatus 1002 and that executes various controls of the image processing apparatus 1002. An operation unit 4002 is used to operate the apparatus. A network cable 4003 is used to access an external apparatus through a network. A telephone line cable 4004 is used to access an external apparatus through a telephone line. A CPU 4005 executes a program for controlling the controller 4001. A RAM 4006 is managed by a program operated on the CPU 4005. The RAM 4006 functions as a receiving buffer for temporarily storing data received from the outside or an image data buffer for temporarily storing image data that is rasterized by a RIP (raster image processor) 4021.

An operation unit interface 4007 connects the operation unit 4002 to the controller 4001. A network interface 4008 connects the controller 4001 to a network. A modem 4009 functions as a telephone line interface for connecting the controller 4001 to a telephone line 4004. A ROM 4010 stores programs executed by the CPU 4005 and data. An HDD 4011 is a nonvolatile storage device capable of storing various data. A CPU bus 4012 is also provided.

An image bus 4024 connects to a hardware group for executing image processing. An image bus interface 4013 connects the CPU bus 4012 to the image bus 4024. A rasterizing board 4021 has a function of converting PDL (page description language) data input from an external computer or the like to bitmap image data. The rasterizing board is also called a RIP. A RIP interface 4014 connects the RIP 4021 to the image bus 4024 through an image transfer bus 4018. A data compressing unit 4015 compresses data.

A device interface 4016 is used to connect the scanner unit 3200 and the printer unit 3300 to the image bus 4024 through data buses 4019 and 4040, respectively. An image processing unit 4017 executes various image processes on bitmap image data generated by the scanner unit 3200 and the RIP 4021. The image processing unit 4017 has a function of digitally correcting/rendering bitmap image data, e.g., an imposing function of processing two-page bitmap image data into one-page bitmap image data.

Figure 5:
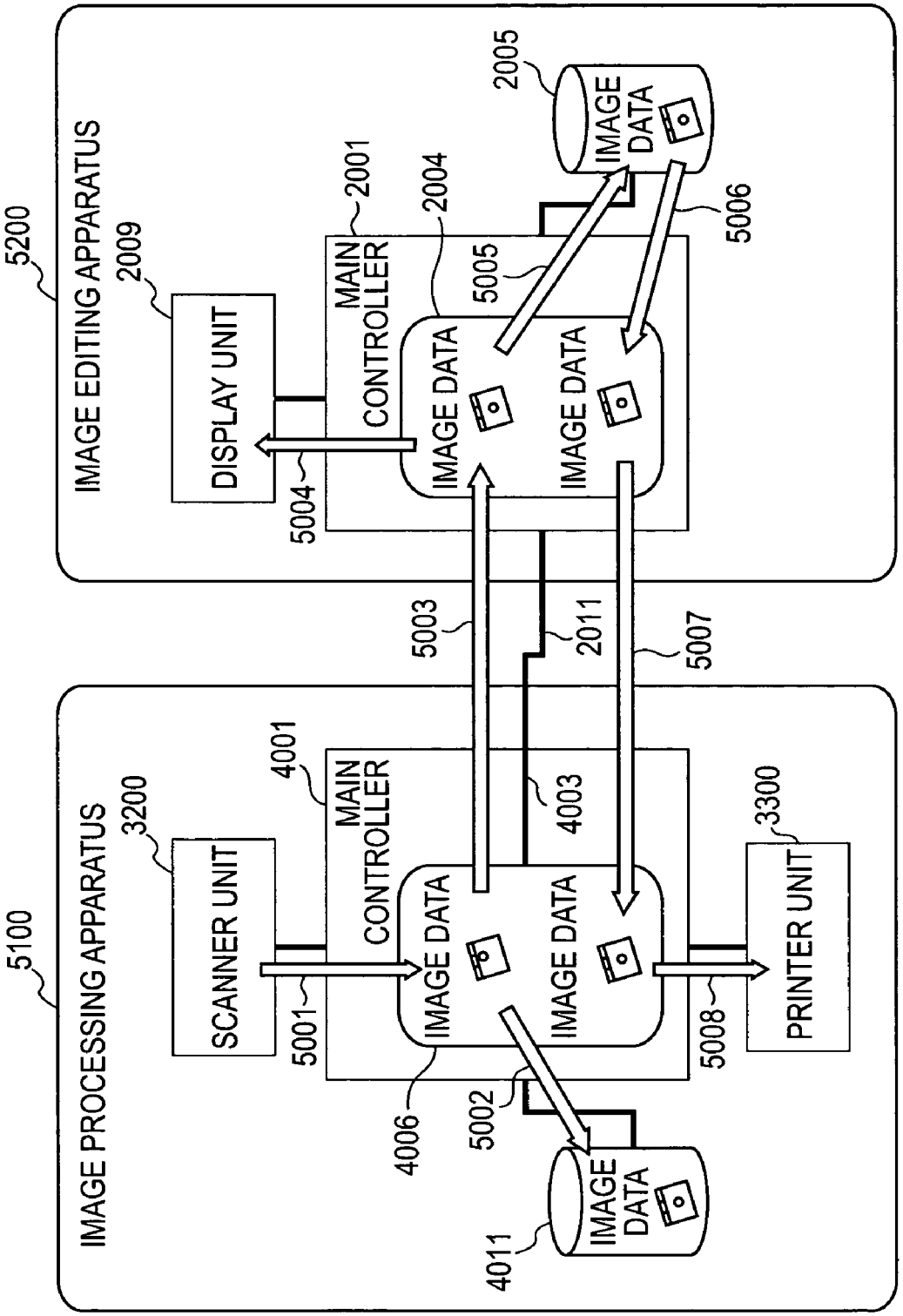
FIG. 5 is a block diagram showing a first image data flow in a known image processing system.

FIG. 5 is a block diagram showing a first image data flow applied in a known image processing system. Herein, the known image data flow is described to clarify a difference from that of the present invention.

The inside of the frame denoted by reference numeral 5100 shows the configuration of the image processing apparatus 1002 shown in FIG. 1. The image processing apparatus 5100 includes the scanner unit 3200 and the printer unit 3300, which have been described above with reference to FIG. 3, and the main controller 4001 for controlling those units, which has been described with reference to FIG. 4. The main controller 4001 connects to the HDD 4011 functioning as a storage device for storing image data and so on.

The inside of the frame denoted by reference numeral 5200 shows the configuration of the image editing apparatus 1001 shown in FIG. 1. As described with reference to FIG. 2, the image editing apparatus 5200 includes the display unit 2009 for displaying image data received from the image processing apparatus and allowing an operator to perform image editing operations and the main controller 2001. The main controller 2001 connects to the HDD 2005 functioning as a storage device for storing image data and so on.

The image processing apparatus 5100 and the image editing apparatus 5200 are connected to each other through the network cables 4003 and 2011, so that they can transmit/receive image data to/from each other.

Arrows 5001 to 5008 shown in FIG. 5 indicate a flow of image data. In the first image data flow according to the known art, a document is read by the scanner unit 3200 provided in the image processing apparatus 5100 in accordance with instructions from an operator. Then, an optical signal generated based on the read document is converted to image data, which is transmitted to the RAM 4006 of the main controller 4001 (indicated by the arrow 5001).

The main controller 4001 stores the image data in the HDD 4011 connected thereto (indicated by the arrow 5002) and transfers the image data to the image editing apparatus 5200 through the network cable 4003 (indicated by the arrow 5003). The order of the processes indicated by the arrows 5002 and 5003 can be changed.

The image editing apparatus 5200 displays the image data, which has been input to the RAM 2004 of the main controller 2001 through the network cable 2011, in the display unit 2009 (indicated by the arrow 5004). Also, the image data is stored in the HDD 2005 connected to the main controller 2001 (indicated by the arrow 5005). The order of the processes indicated by the arrows 5004 and 5005 can be changed.

The image data is edited in the display unit 2009 by the operator. Then, if an image printing instruction is provided, the edited image data on the RAM 2004 is stored in the HDD 2005. Then, the image data is read to the RAM 2004 of the main controller 2001 (indicated by the arrow 5006) and is transmitted to the image processing apparatus 5100 through the network cable 2011.

The image data transmitted from the image editing apparatus 5200 is input to the RAM 4006 of the main controller 4001 of the image processing apparatus 5100 through the network cable 4003 (indicated by the arrow 5007). The main controller 4001 of the image processing apparatus 5100 transmits the image data stored in the RAM 4006 to the printer unit 3300 so as to execute a printing process (indicated by the arrow 5008).

Figure 6:
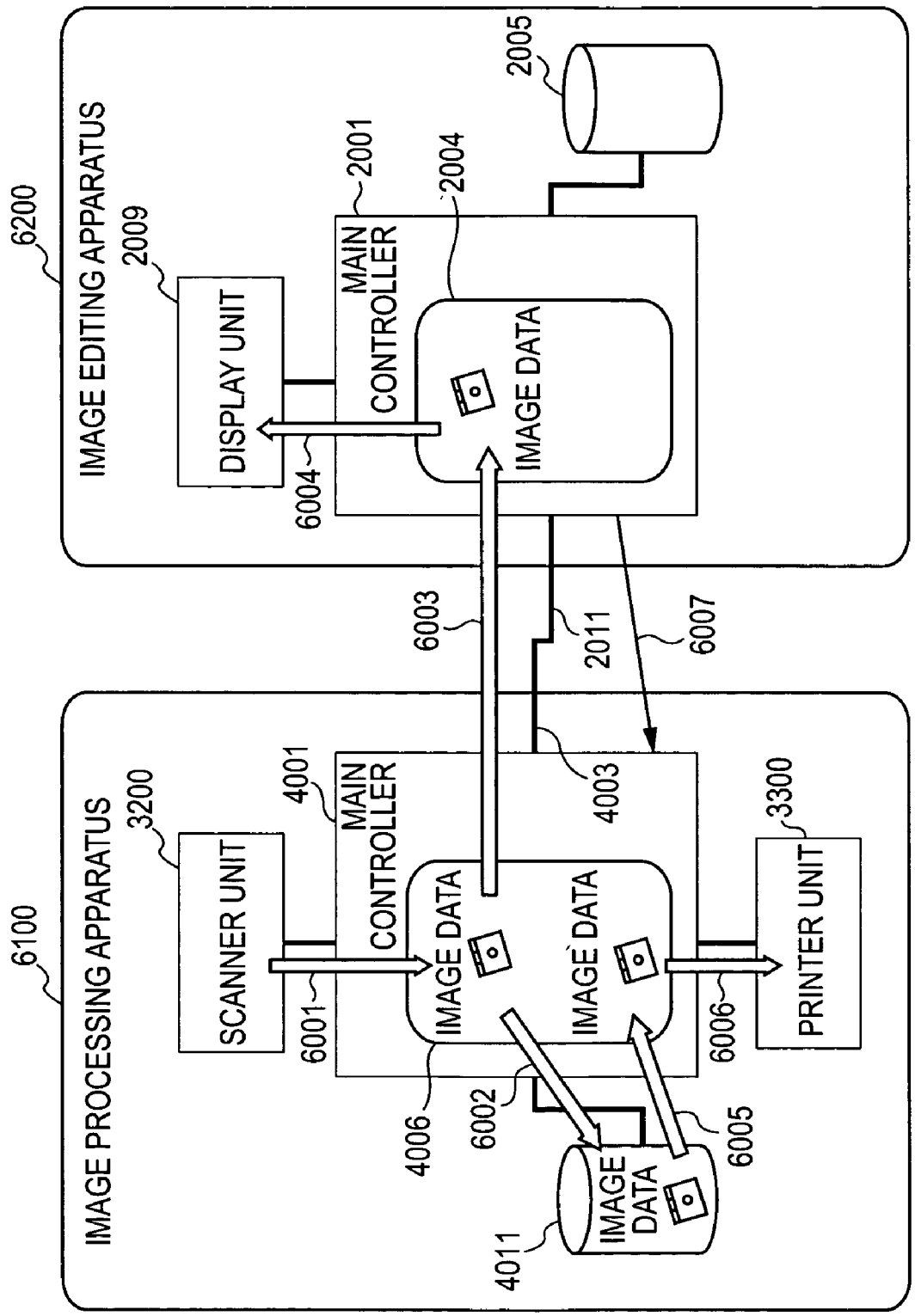
FIG. 6 is a block diagram showing a second image data flow in the image processing system according to a first embodiment of the present invention.

FIG. 6 is a block diagram showing a second image data flow applied in the image processing system according to the first embodiment. The configurations of an image processing apparatus 6100 and an image editing apparatus 6200 are the same as those shown in FIG. 5 and thus the description thereof is not repeated.

Arrows 6001 to 6006 shown in FIG. 6 indicate a flow of image data. An arrow 6007 indicates transmission of an instruction to execute an image editing function on the image data. In the image data flow shown in FIG. 6, a document is read by the scanner unit 3200 provided in the image processing apparatus 6100 in accordance with instructions from an operator, the read data is converted to image data, and the image data is transmitted to the RAM 4006 of the main controller 4001 (indicated by the arrow 6001).

The main controller 4001 stores the image data in the HDD 4011 connected thereto (indicated by the arrow 6002). Then, the image data is transferred to the image editing apparatus 6200 through the network cable 4003 (indicated by the arrow 6003). The order of the processes indicated by the arrows 6002 and 6003 can be changed.

The image editing apparatus 6200 displays the image data, which has been input to the RAM 2004 of the main controller 2001 through the network cable 2011, in the display unit 2009 (indicated by the arrow 6004). The image data is edited in the display unit 2009 by the operator. Then, if an image printing instruction is provided, the main controller 2001 generates image editing function information indicating the content of image editing. The image editing function information is described below. Then, the main controller 2001 transmits the generated image editing function information to the main controller 4001 of the image processing apparatus 6100 through the network cable 2011 (indicated by the arrow 6007).

In the image processing apparatus 6100, the image data is read from the HDD 4011 to the RAM 4006 (indicated by the arrow 6005). Then, the read image data is edited in accordance with the image editing function information, which has been input to the main controller 4001 through the network cable 4003, and the edited image data is transmitted to the printer unit 3300 so as to be printed (indicated by the arrow 6006).

Figure 7:
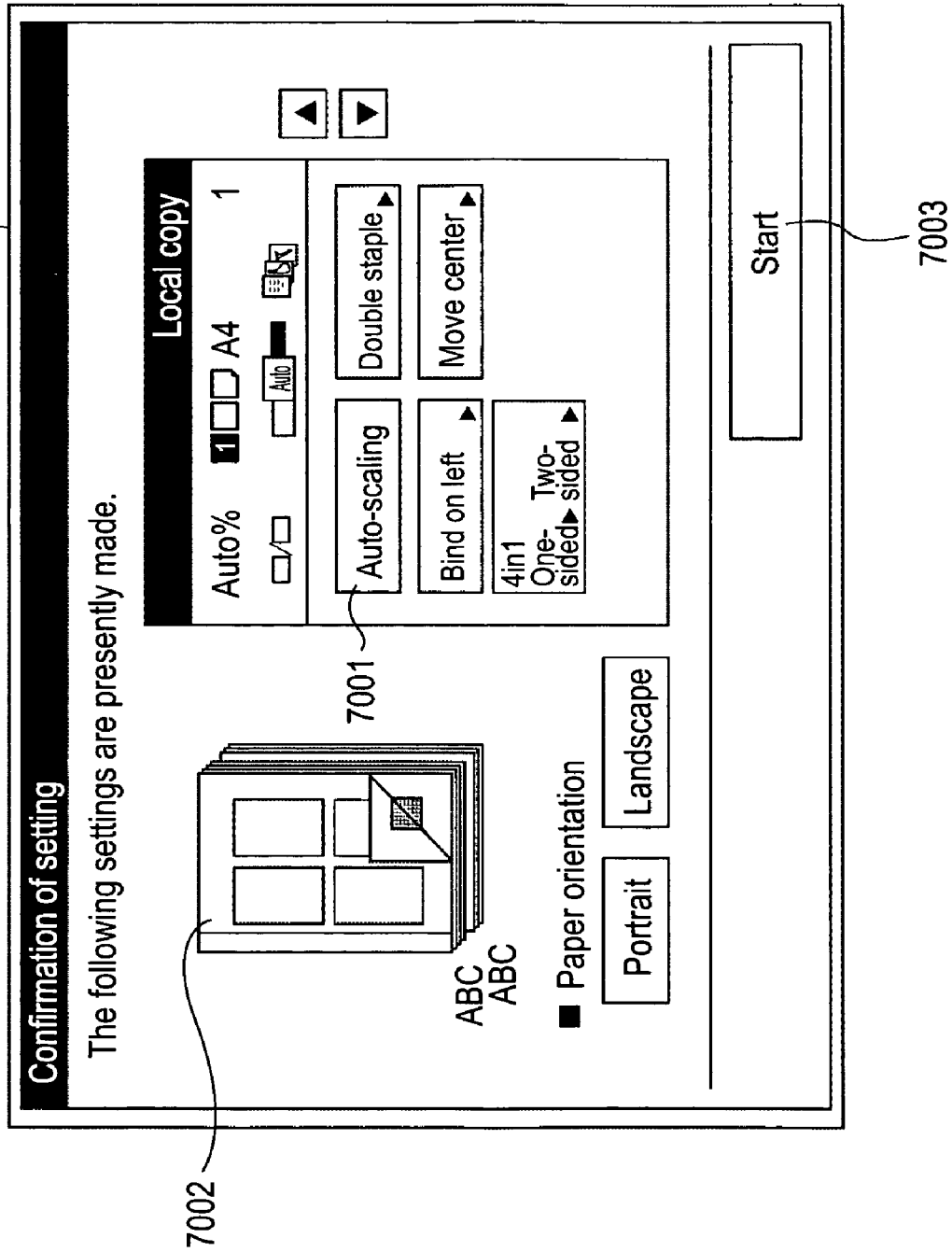
FIG. 7 is a view showing an exemplary operation unit of the image processing apparatus.

FIG. 7 is a view showing an exemplary operation unit 7000 provided in the image processing apparatus. The exemplary operation unit 7000 shown in FIG. 7 includes an image process command button 7001 used to specify an image process to be executed on an image read by the scanner unit 3200 in the image processing unit 4017 of the image processing apparatus. In a preview image display area 7002, an operator can preview a result of the image process specified by the image process command button 7001. A start button 7003 is used to start a process in accordance with the image process specified by the image process command button 7001.

After a process starts upon a press of the start button 7003, the scanner unit 3200 reads an image. The read image data is stored in the HDD 4011 of the image processing apparatus 1002 and is transmitted to the image processing unit 4017. Then, the image data is processed in accordance with the image processing instruction set in the image processing unit 4017.

Figure 8:
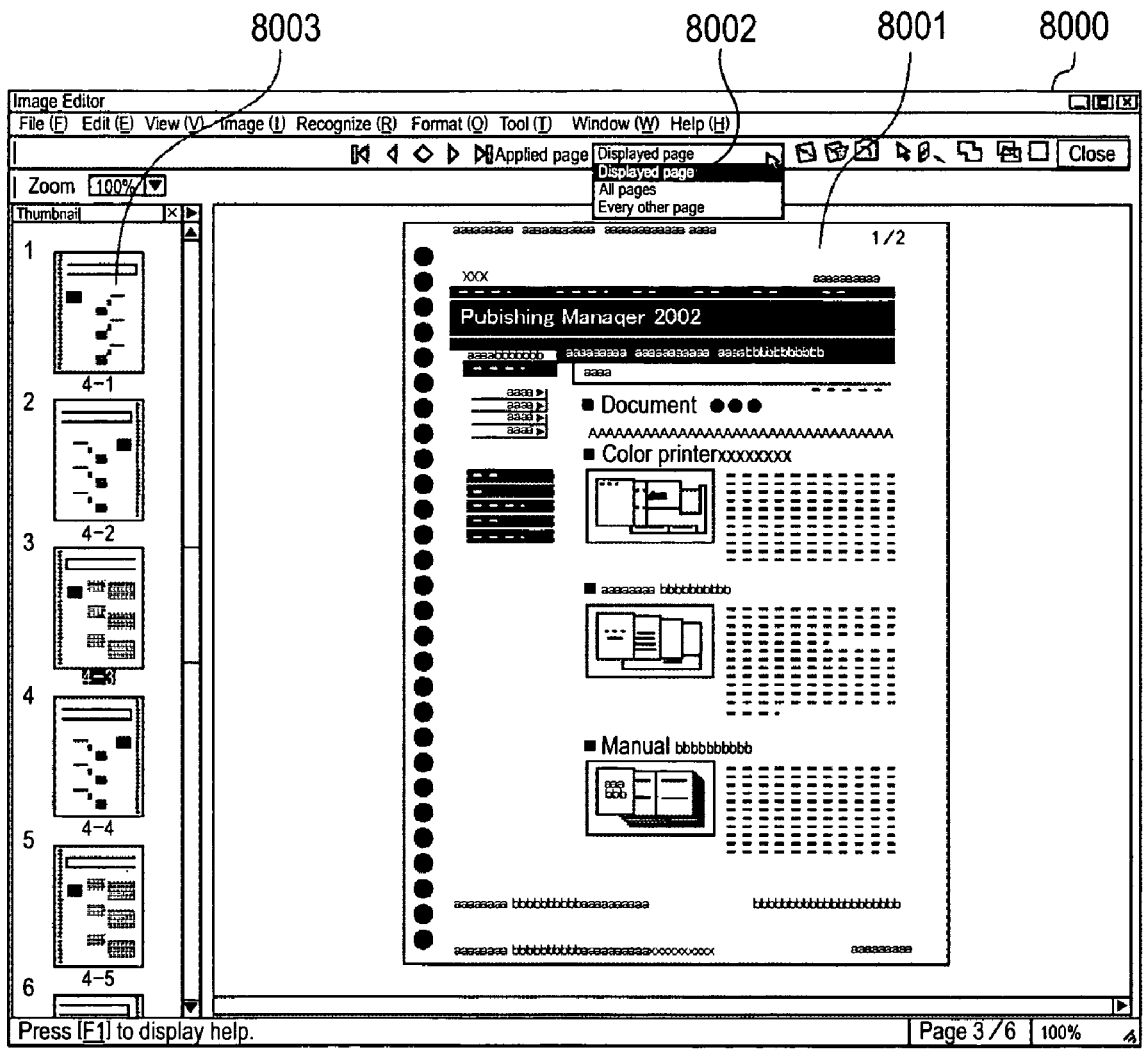
FIG. 8 is a view showing an exemplary operation screen displayed in the image editing apparatus.

FIG. 8 shows an exemplary image editing screen 8000 displayed in the display unit 2009 provided in the image editing apparatus 1001. This image editing screen is an example of an operation screen of an image editing application stored in the computer.

In a preview image display area 8001, an operator can see bitmap image data received from the network communication unit 2006.

A display menu 8002 is used to select the type of image process to be executed on the image data displayed in the preview image display area 8001. The display menu 8002 includes an image processing menu for an entire area or a specific area of the image displayed in the preview image display area 8001, an image processing menu using data of a plurality of pages, and a menu related to a printing operation. In a thumbnail image display area 8003, thumbnails of all pieces of bitmap image data included in a job received from the network communication unit 2006 are displayed. By selecting a thumbnail image displayed in the thumbnail image display area 8003 by using the pointing device 2014, the operator can display the selected thumbnail image in the preview image display area 8001. Then, the operator edits the image by using the image editing screen shown in FIG. 8.

Figure 9:
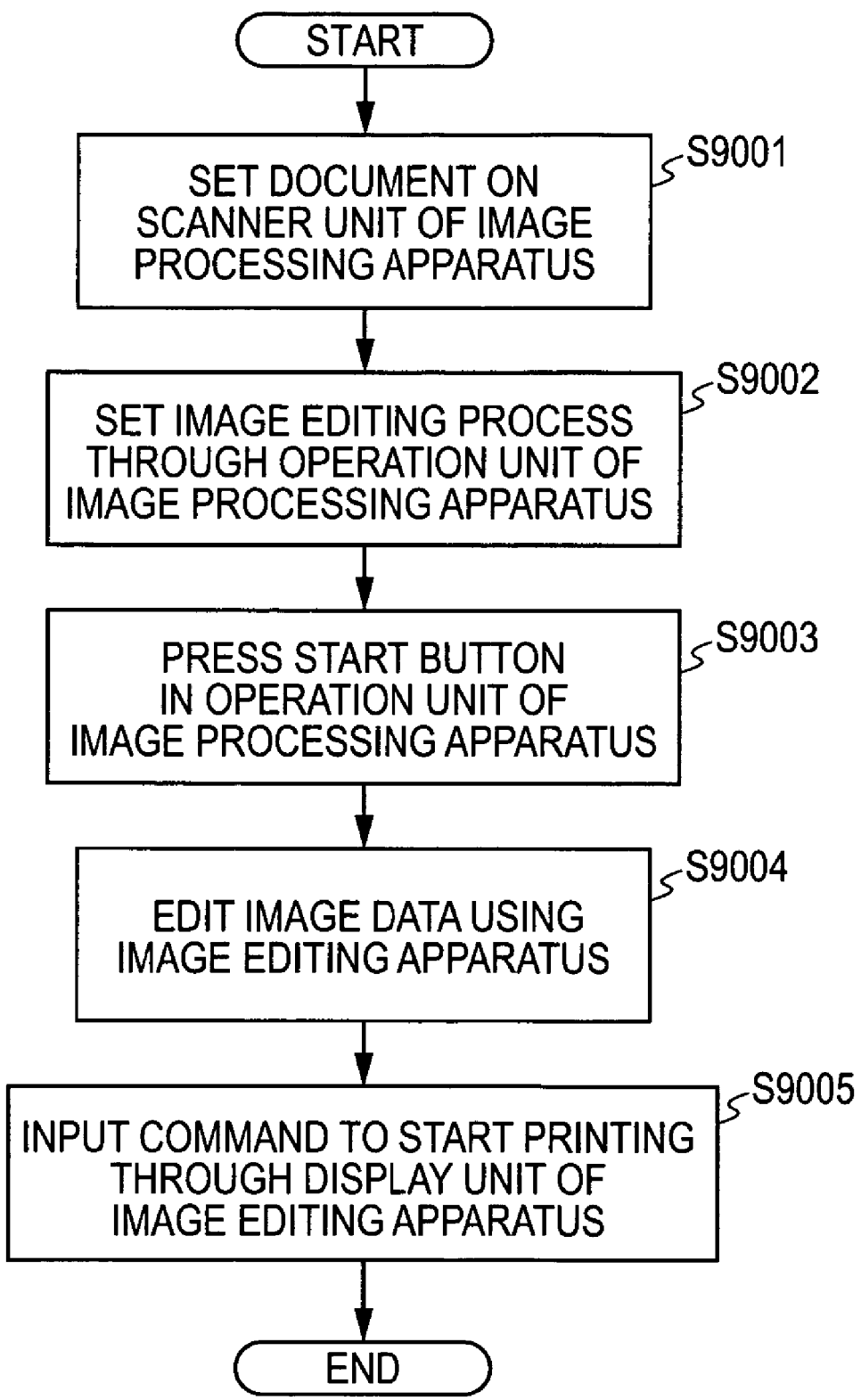
FIG. 9 is a flowchart showing an operation procedure executed in the image processing system.

FIG. 9 is a flowchart showing a procedure of operating the image processing system. A procedure of operating the image processing system according to an embodiment of the present invention performed by an operator is described next with reference to FIG. 9.

In step S9001, the operator sets a desired document on the scanner unit 3200 of the image processing apparatus 1002. Then, in step S9002, the operator sets an image process to be executed in reading the document through the operation unit 4002 of the image processing apparatus 1002. This operation is not necessarily done. That is, the setting operation need not be done if the default image processing setting can be used as is.

In step S9003, the operator presses the start button 7003 of the image processing apparatus 1002 to input a command of starting to read the document. In response to the read starting command, the scanner unit 3200 reads the document and transmits image data to the image editing apparatus 1001 after the above-described process.

In step S9004, the operator edits the image data read in step S9003 by using the image editing apparatus 1001. After completing a desired image editing process, the operator provides an instruction to start printing the image data from the image editing apparatus 1001 in step S9005.

FIG. 10 is a table showing a list of image processing functions that can be executed by the image editing apparatus 1001 and the image processing apparatus 1002 in the image processing system. Herein, the table is described in character strings that can be read by people for easy understanding, but the present invention is not limited to this format. Also, the types of image processing functions are not limited to those shown in the table.

Referring to the table, a column 10001 shows image editing function identifier information that indicates the types of image processing functions. A column 10002 shows flags indicating whether the image processing functions identified by the image editing function identifier information 10001 can be executed in the image processing apparatus 1002. A column 10003 shows flags indicating whether the image processing functions identified by the image editing function identifier information 10001 can be executed in the image editing apparatus 1001.

The image editing apparatus 1001 and the image processing apparatus 1002 store the image processing function list 10000 in advance in their internal storage devices and use the list 10000 to determine whether the image processing functions can be executed in the apparatus.

Figure 16:
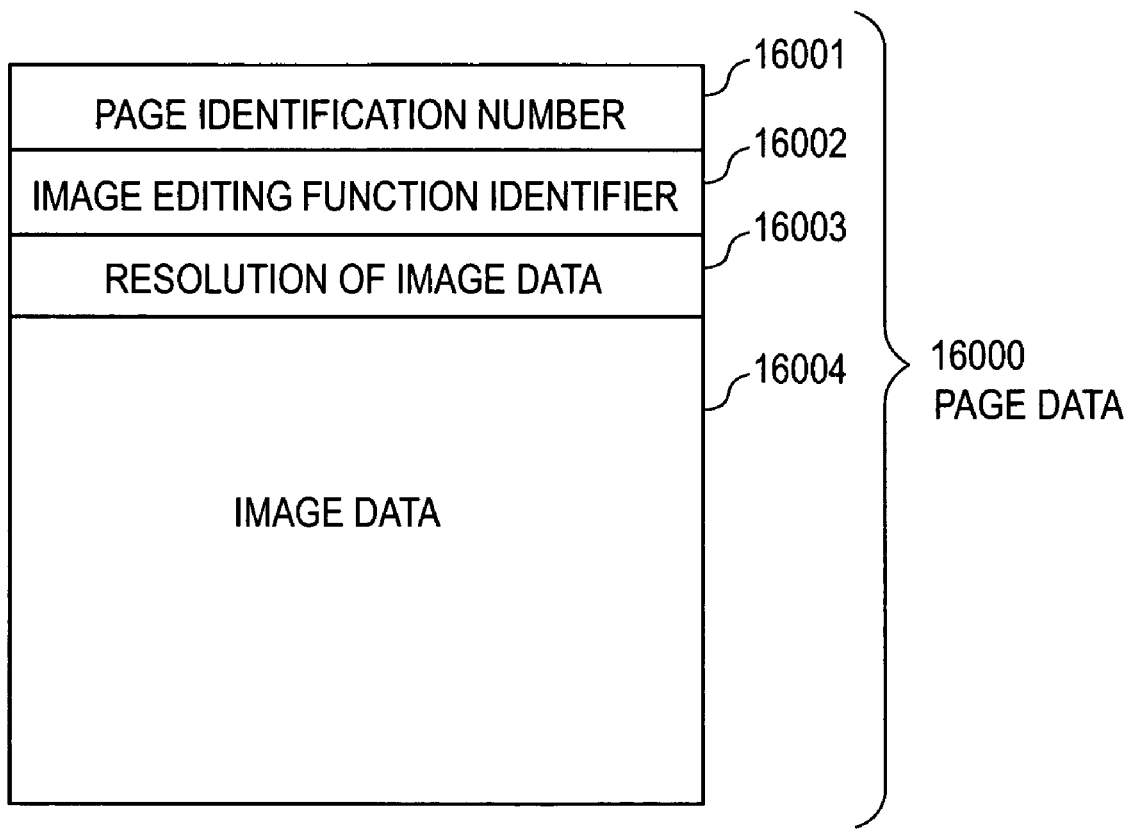
FIG. 16 shows a data format for holding image data used in the image processing system.

FIG. 16 shows the format of image data generated in the image processing apparatus 1002 and the image editing apparatus 1001 of the image processing system. An area 16001 stores a page identification number for identifying the page of a document read by the scanner unit 3200. An area 16002 stores an image editing function identifier for defining the image processing function to be executed on the image data. An area 16003 stores resolution information of the image data. An area 16004 stores the image data itself. The image data stored in the area 16004 has the resolution indicated by the resolution information stored in the area 16003.

In this embodiment, data recorded with the image data format 16000 is defined as page data in the following description. In the first embodiment, the area storing resolution information is not always necessary.

In a typical image processing system according to the known art, image data of a read document is edited and printed in accordance with the image data flow shown in FIG. 5 and along the process shown in FIG. 9 by an operator. However, in the image processing system according to this embodiment, image data of a read document is edited and printed in accordance with the image data flow shown in FIG. 6 and along the process shown in FIG. 9 by an operator.

Now, a procedure of controlling the image processing apparatus 1002 and the image editing apparatus 1001 according to this embodiment is described with reference to the flowcharts shown in FIGS. 11, 12, and 13.

Figure 11:
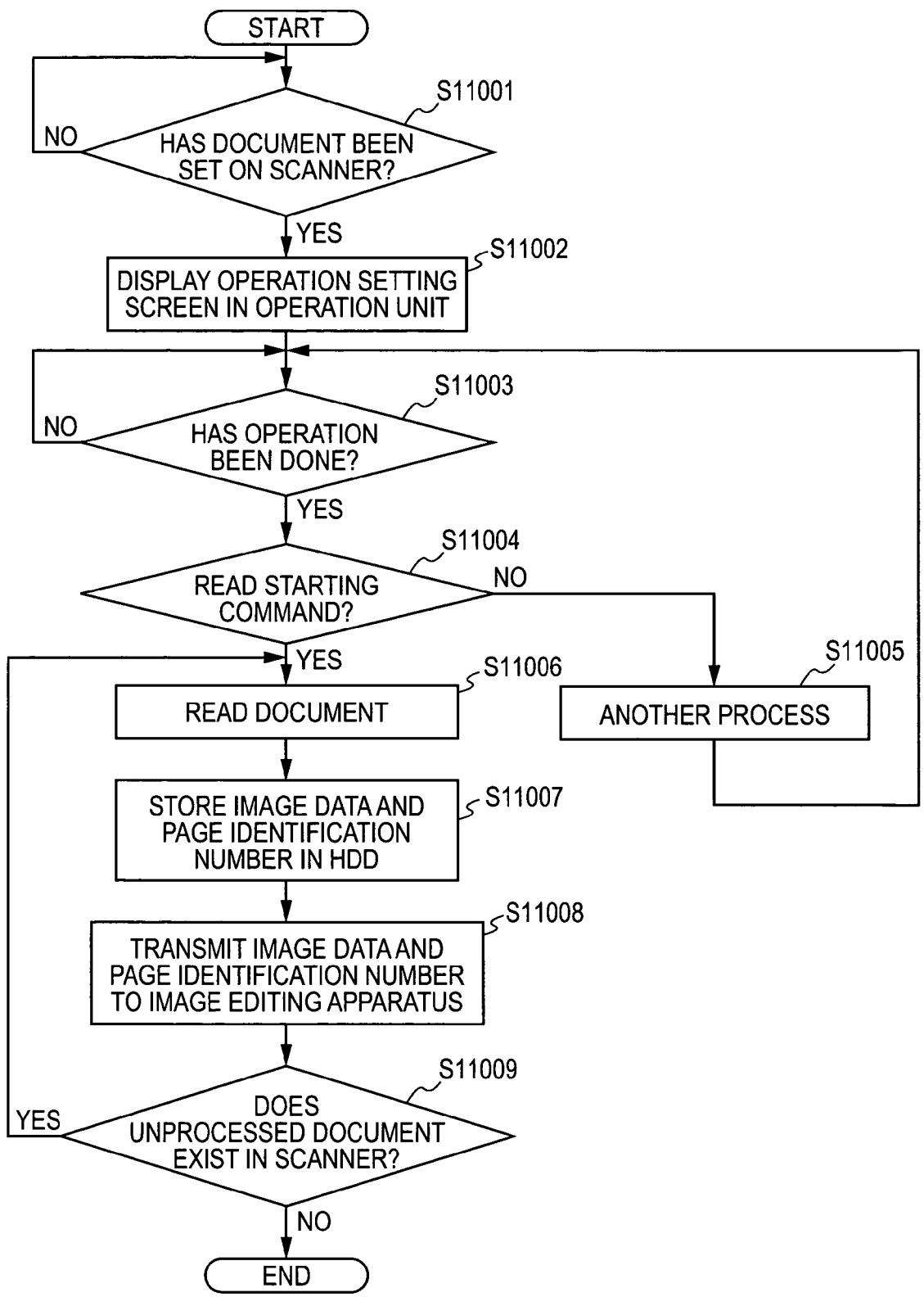
FIG. 11 is a flowchart showing the control in the image processing apparatus according to the first embodiment of the present invention.

FIG. 11 is a flowchart showing a process of reading a document by controlling the scanner unit 3200 and generating a digital image, executed by the image processing apparatus 1002. Each step of this flowchart is predominantly executed by the CPU 4005 of the image processing apparatus 1002.

First, in step S11001, the CPU 4005 determines whether a document has been set on a document glass of the scanner unit 3200. If the CPU 4005 determines in step S11001 that a document has been set on the document glass of the scanner unit 3200, the process proceeds to step S11002. In step S11002, the CPU 4005 displays an operation setting screen for allowing the operator to specify an image process to be executed on the document set on the scanner unit 3200 in the operation unit 4002. The order of steps S11001 and S11002 can be changed.

In step S11003, the CPU 4005 determines whether an operation has been done on the operation setting screen, which was displayed in the operation unit 4002 in step S11002. If the CPU 4005 determines in step S11003 that an operation has been done on the operation setting screen displayed in the operation unit 4002, the process proceeds to step S11004.

In step S11004, the CPU 4005 determines whether the operation done in step S11003 is input of a read starting command. If the CPU 4005 determines in step S11004 that the operation done in step S11003 is not input of a read starting command, the process proceeds to step S11005 where a process is executed in accordance with the input command, and then the process returns to step S11003.

If the CPU 4005 determines in step S11004 that the operation done in step S11003 is input of a read starting command, the process proceeds to step S11006. In step S11006, the document is read by the scanner unit 3200, page identification numbers are assigned to the respective pages in the read order, the read document images are converted to digital image data each having the data format of the page data 16000, and the digital image data is stored in the RAM 4006. In this case, information indicating that an image process is not executed is recorded in the image editing function identifier area 16002 and processing resolution information in reading the document is recorded in the resolution information area 16003 of the page data 16000.

In step S11007, the image data stored in the RAM 4006 in step S11006 is stored in the HDD 4011.

In step S11008, the image data stored in the RAM 4006 in step S11006 is transmitted to the image editing apparatus 1001 through the network I/F 4008. In step S11009, the CPU 4005 determines whether an unprocessed document exists in the scanner unit 3200. If the CPU 4005 determines in step S11009 that an unprocessed document exists in the scanner unit 3200, the process returns to step S11006. Otherwise, the process of reading the document in the image processing apparatus 1002 ends. The transmission step S11008 can be executed after all sheets of the document have been read.

A process executed by the image editing apparatus 1001 after receiving the image data from the image processing apparatus 1002 is described next. FIG. 12 is a flowchart showing an image converting process executed by the image editing apparatus 1001 after it receives image data from the image processing apparatus 1002. This process is predominantly executed by the CPU 2002 of the image editing apparatus 1001.

In step S12001, the CPU 2002 determines whether image data has been input from the image processing apparatus 1002 through the network communication unit 2006. If the CPU 2002 determines in step S12001 that image data has been input from the image processing apparatus 1002, the process proceeds to step S12002.

In step S12002, the CPU 2002 displays an operation setting screen allowing the operator to input commands of image processes in the display unit 2009. The image data input from the image processing apparatus 1002 is displayed on this operation setting screen. The operation setting screen displayed in step S12002 may be displayed according to any method, e.g., the screen may be displayed in response to a command from the operator or may be displayed automatically. The screen displayed in the display unit 2009 is the screen shown as an example in FIG. 8.

In step S12003, the CPU 2002 determines whether an operation has been done on the operation setting screen, which was displayed in the display unit 2009 in step S12002. If the CPU 2002 determines in step S12003 that an operation has been done on the operation setting screen, the process proceeds to step S12004.

In step S12004, the CPU 2002 determines whether the operation done in step S12003 is input of a print starting command. If the CPU 2002 determines in step S12004 that the operation done in step S12003 is not input of a print starting command, the process proceeds to step S12005.

In step S12005, the CPU 2002 determines whether the operation done in step S12003 is input of an image editing command. If the CPU 2002 determines in step S12005 that the operation done in step S12003 is not input of an image editing command, the process proceeds to step S12006.

In step S12006, the CPU 2002 executes a process in accordance with the operation done in step S12003, and then the process returns to step S12003.

If the CPU 2002 determines in step S12005 that the operation done in step S12003 is input of an image editing command, the process proceeds to step S12007. In step S12007, the CPU 2002 refers to the image processing function list 10000 shown in FIG. 10 to determine whether the image editing process specified in step S12003 can be executed in the image processing apparatus 1002. If the CPU 2002 determines in step S12007 that the image editing process specified in step S12003 can be executed in the image processing apparatus 1002, the process proceeds to step S12008.

In step S12008, the CPU 2002 does not execute the image editing process on the input image data. Instead of that, the CPU 2002 sets an image editing function identifier corresponding to the image editing process specified in step S12003 and edit information indicating the details of the editing process to the image editing function identifier area 16002 of the page data 16000. Then, the CPU 2002 stores the information in the RAM 2004 and the process returns to step S12003.

For example, when the image editing process specified in step S12003 is scaling-up by 150%, the CPU 2002 refers to the image processing function list 10000 and determines that the image processing apparatus 1002 can execute the scaling-up. In that case, in step S12008, identifier information indicating scaling-up and editing information indicating that the scaling factor is 150% are generated and are stored in the image editing function identifier area 16002 of the page data 16000.

Although the above description says that an image editing process is not executed on the input image data, image data displayed on the operation setting screen may be edited in accordance with an editing command.

If it is determined in step S12007 that the image editing function specified in step S12003 cannot be executed in the image processing apparatus 1002, the process proceeds to step S12009. In step S12009, an image editing process is executed in accordance with the image editing command input and processing returns to step S12003.

On the other hand, if the CPU 2002 determines in step S12004 that the operation done in step S12003 is input of a print starting command, the process proceeds to step S12010. In step S12010, the CPU 2002 determines whether an identifier corresponding to an editing function that can be executed in the image processing apparatus 1002 is stored in the image editing function identifier area 16002 included in the image data. If the CPU 2002 determines in step S12010 that the image editing function identifier and edit information about the image editing process are stored in the image editing function identifier area 16002 included in the image data, the process proceeds to step S12011.

In step S12011, data in which information is stored in the page identification number area 16001 and in the image editing function identifier area 16002 but image data is not stored in the image data area 16004 is transmitted to the image processing apparatus 1002. In other words, the image data itself is not transmitted to the image processing apparatus 1002, but a page identification number for specifying the page to be edited and information for specifying the details of the editing process, i.e., image editing function identifier information and editing information, are transmitted as print data to the image processing apparatus 1002. Processing then proceeds to step S12013.

If it is determined in step S12010 that the image editing function identifier is not stored in the image editing function identifier area 16002 included in the image data, the process proceeds to step S12012. In step S12012, the image data that was processed in step S12009 in accordance with the input editing command is stored in the image data area 16004 so as to generate page data. Then, the page data that includes the page identification number area 16001 and the image editing function identifier area 16002 is transmitted as print data to the image processing apparatus 1002. Processing then proceeds to step S12013.

In step S12013, it is determined whether all image data to be printed have been transmitted to the image processing apparatus 1002. If it is determined in step S12013 that not all image data have been transmitted to the image processing apparatus 1002, the process returns to step S12010.

If it is determined in step S12013 that all image data to be printed have been transmitted to the image processing apparatus 1002, the process in the image editing apparatus 1001 ends.

In the print data transmitting step S12012, all image data to be printed may be transmitted as a single print job. In that case, the data in which image edit information was generated in step S12008 is not image data itself but only includes information stored in the page identification number area 16001 and information stored in the image editing function identifier area 16002. Therefore, when all print data to be printed are regarded as a single print job, page data including the image data and page data that does not include image data form the single print job.

Figure 13:
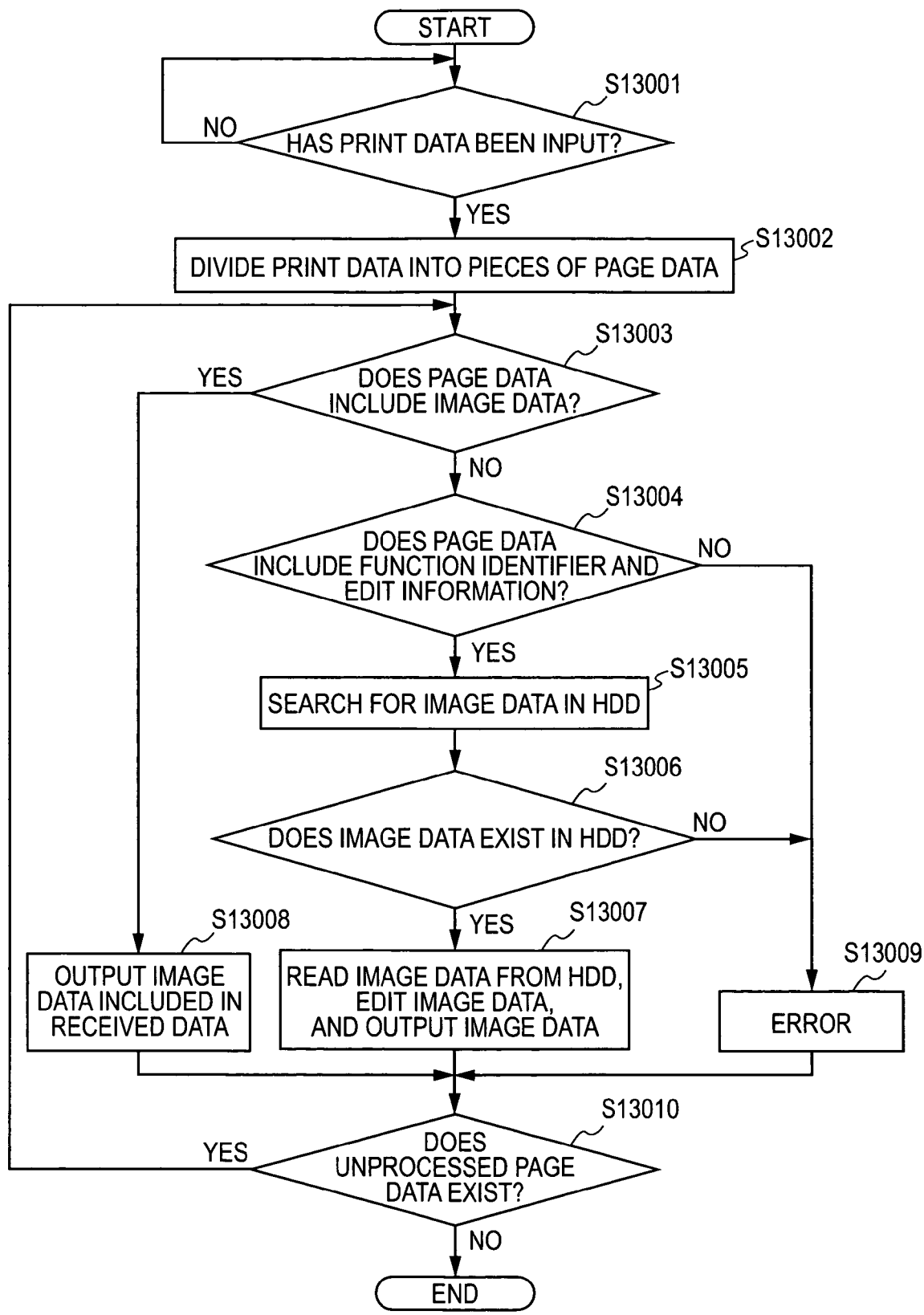
FIG. 13 is a flowchart showing the control in the image processing apparatus according to the first embodiment of the present invention.

FIG. 13 is a flowchart showing a process of printing print data received from the image editing apparatus 1001, executed in the image processing apparatus 1002. This process is predominantly executed by the CPU 4005 of the image processing apparatus 1002.

In step S13001, the CPU 4005 determines whether print data has been input through the network cable 4003.

If the CPU 4005 determines in step S13001 that print data has been input, the process proceeds to step S13002. In step S13002, the input print data is divided into pieces of page data. This dividing step need not be executed if the print data transmitted from the image editing apparatus 1001 is input in units of pages.

Then, in step S13003, the CPU 4005 determines whether real image data is included in the image data area 16004 of each page data 16000 generated in the dividing step S13002.

If the CPU 4005 determines in step S13003 that real image data is not included in the image data area 16004 of the page data 16000, the process proceeds to step S13004.

In step S13004, the CPU 4005 determines whether the image editing function identifier area 16002 of the page data includes an identifier corresponding to the process to be executed in the image processing apparatus 1002 and information about the image editing process (edit information). If the CPU 4005 determines in step S13004 that the image editing function identifier area 16002 of the page data does not include the identifier and edit information, an error process is executed in step S13009 and then the process proceeds to step S13010.

If the CPU 4005 determines in step S13004 that the image editing function identifier area 16002 of the page data includes the identifier of a process to be executed and edit information, the process proceeds to step S13005.

In step S13005, the CPU 4005 searches for image data corresponding to the page identification number that is stored in the page identification number area 16001 of the page data, in the HDD 4011. Then, in step S13006, the CPU 4005 determines whether the image data exists in the HDD 4011. If the CPU 4005 determines in step S13006 that the image data does not exist in the HDD 4011, the process proceeds to step S13010 through the error processing step S13009. If the CPU 4005 determines in step S13006 that the image data exists in the HDD 4011, the process proceeds to step S13007.

In step S13007, the found image data is read from the HDD 4011. Then, the read image data is edited in accordance with the identifier information indicating the type of image editing process and edit information indicating the details of the editing process that are stored in the image editing function identifier area 16002 of the page data. The image editing process is executed by the image processing unit 4017 based on the identifier information and edit information of the page data transmitted from the image editing apparatus 1001. Then, the edited image data is transmitted to the printer unit 3300 so as to be printed. Processing then proceeds to step S13010.

On the other hand, if it is determined in step S13003 that image data edited by the image editing apparatus 1001 is included in the image data area 16004 of the page data 16000, which was generated in the dividing step S13002, the process proceeds to step S13008.

In step S13008, the image data included in the image data area 16004 of the page data 16000 is transmitted to the printer unit 3300 so as to be printed. Processing then proceeds to step S13010.

In step S13010, it is determined whether there exists unprinted page data among pieces of page data 16000 generated in the dividing step S13002. If it is determined in step S13010 that unprinted page data exists, the process returns to step S13003.

If it is determined in step S13010 that all pieces of page data 16000 have been printed, the printing process in the image processing apparatus 1002 ends.

That is, among image data assigned with an editing command in the image editing apparatus 1001, image data assigned with an editing command that cannot be executed by the image processing apparatus 1002 is edited in accordance with edit information specified by the image editing apparatus 1001, and the edited image data is transmitted to the image processing apparatus 1002. The image processing apparatus 1002 receives the edited image data and outputs it. However, image data assigned with an editing command that can be executed by the image processing apparatus 1002 is not edited by the image editing apparatus 1001, but edit information is transmitted to the image processing apparatus 1002. The image processing apparatus 1002 receives the edit information, reads the corresponding image data that was stored at reading from the HDD, edits the read image data in accordance with the received edit information, and then outputs the edited image data.

With this configuration, not all image data needs to be transmitted/received between the image editing apparatus 1001 and the image processing apparatus 1002, so that the throughput of a printing process can be enhanced.

Further, since the image processing apparatus 1002 and the image editing apparatus 1001 use the common data format shown in FIG. 16, data conversion or the like need not be performed when data is transmitted/received therebetween. Accordingly, high-speed processing is realized.

Figure 12:
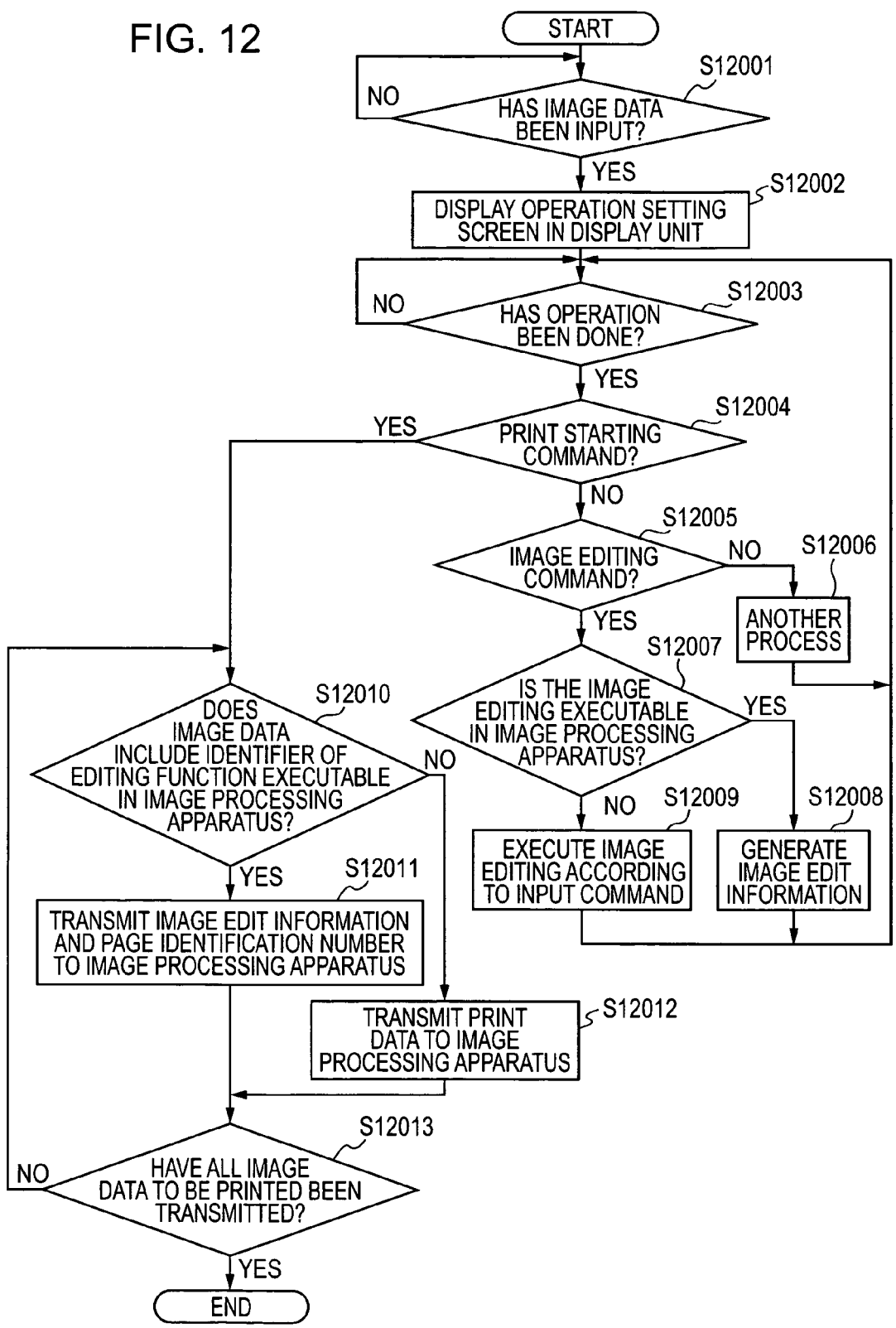
FIG. 12 is a flowchart showing the control in the image editing apparatus according to the first embodiment of the present invention.

In the editing process executed in the image editing apparatus 1001 shown in FIG. 12, a plurality of types of image editing processes may be executed on one piece of image data. In this situation, the following three cases may occur: all of the plurality of types of image editing processes can be executed in the image processing apparatus 1002 (case 1); some of the plurality of types of image editing processes can be executed in the image processing apparatus 1002 and the other(s) can be executed only in the image editing apparatus 1001 (case 2); and all of the plurality of types of image editing processes can be executed only in the image editing apparatus 1001 (case 3).

In case 1, the determination made in step S12007 in FIG. 12 is "YES" in all of the plurality of image editing processes. Therefore, in case 1, identifier information and image edit information of the respective image editing processes are generated and are stored in the corresponding image editing function identifier areas 16002, respectively.

In case 2, two processing methods are possible. In a first processing method, even an editing function that can be executed in the image processing apparatus 1002 is executed in the image editing apparatus 1001. In a second processing method, an editing function that can be executed only in the image editing apparatus 1001 is executed in the image editing apparatus 1001, whereas an editing function that can be executed in the image processing apparatus 1002 is executed in the image processing apparatus 1002. Note that, in the second processing method, image data edited with an editing function that is executable only in the image editing apparatus 1001 has to be transmitted together with identification information and edit information indicating the editing process to be executed in the image processing apparatus 1002 to the image processing apparatus 1002 as page data. That is, when the second processing method is executed in case 2, a step of determining whether both edited image data and identifier/edit information exist may be provided between steps S12004 and S12010 in the flowchart shown in FIG. 12. If it is determined in this step that both edited image data and identifier/edit information exist, these data and information are transmitted to the image processing apparatus 1002.

In case 3, the plurality of types of image editing processes are executed on image data and the image data as print data is transmitted to the image processing apparatus 1002.

The configurations of the three cases where a plurality of types of image editing processes are executed have been described above.

Additionally, when an imposing process of laying out image data of a plurality of pages in one sheet is specified in the image editing apparatus 1001, identifier information indicating an imposing process is stored. Further, edit information indicating which image data should be imposed is generated. For example, when image data of first and second pages is imposed on one sheet of paper, identifier information indicating an imposing process and edit information indicating how to lay out the first and second pages are stored in the identifier area 16002 of the first page. If no editing process other than the imposing process is to be executed on the second page, the page data of the second page should not be transmitted to the image processing apparatus 1002. Accordingly, unnecessary transmission of data can be prevented, which further contributes to enhance the throughput.

<Second Embodiment>

A procedure of controlling the image processing apparatus 1002 and the image editing apparatus 1001 according to a second embodiment is described below with reference to the flowcharts shown in FIGS. 14 and 15.

Figure 14:
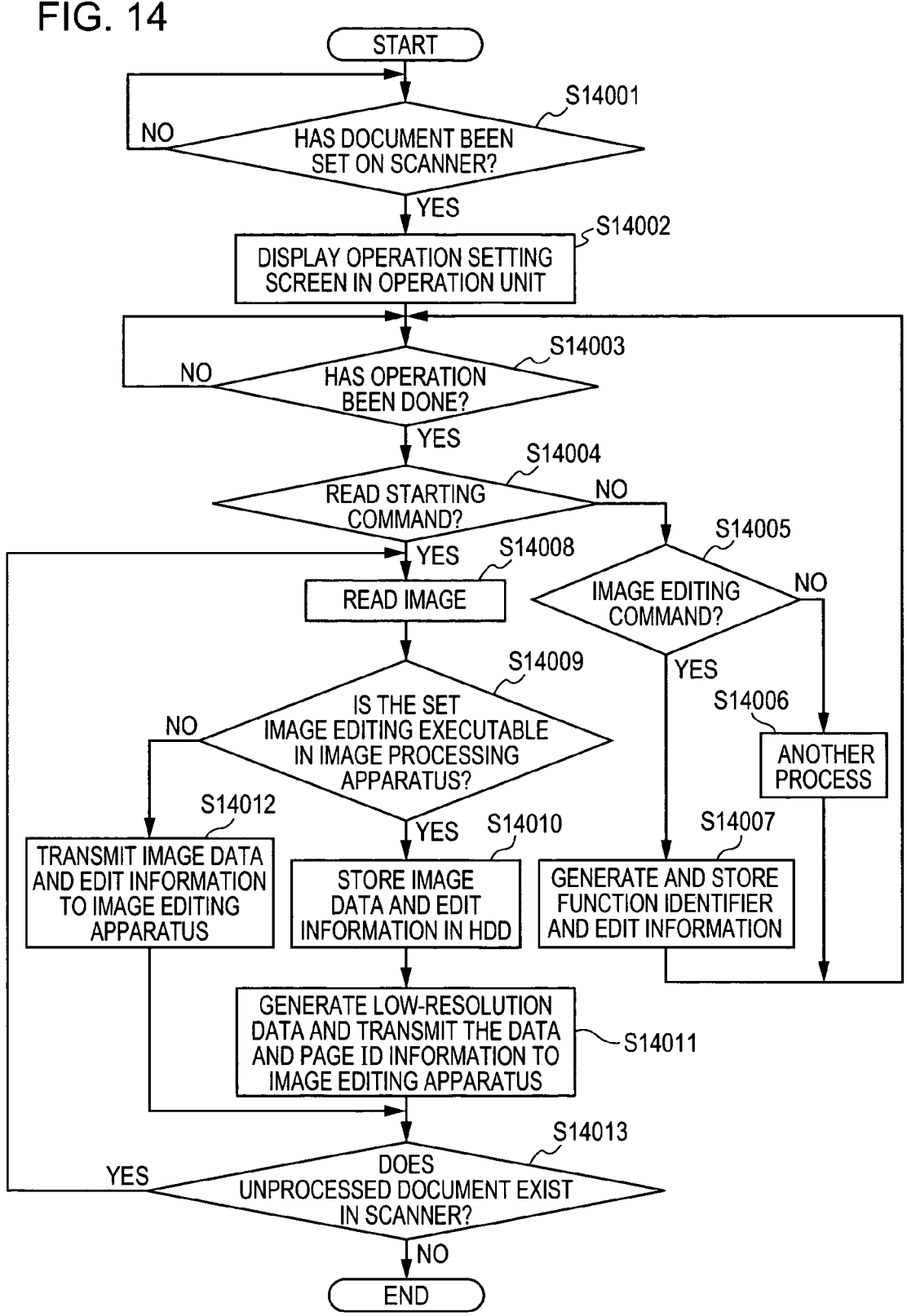
FIG. 14 is a flowchart showing the control in the image processing apparatus according to a second embodiment of the present invention.

FIG. 14 is a flowchart showing a process of reading a document and converting it to a digital image by controlling the scanner unit 3200, executed by the image processing apparatus 1002. This process is predominantly executed by the CPU 4005.

First, in step S14001, the CPU 4005 determines whether a document has been set on the document glass of the scanner unit 3200. If the CPU 4005 determines in step S14001 that a document has been set on the document glass of the scanner unit 3200, the process proceeds to step S14002.

In step S14002, the CPU 4005 displays an operation setting screen for allowing the operator to specify an image editing process to be executed on the document set on the scanner unit 3200 in the operation unit 4002. The order of steps S14001 and S14002 can be changed.

In step S14003, the CPU 4005 determines whether an operation has been done on the operation setting screen, which was displayed in the operation unit 4002 in step S14002.

If the CPU 4005 determines in step S14003 that an operation has been done on the operation setting screen displayed in the operation unit 4002, the process proceeds to step S14004. In step S14004, the CPU 4005 determines whether the operation done in step S14003 is input of a read starting command. If the CPU 4005 determines in step S14004 that the operation done in step S14003 is not input of a read starting command, the process proceeds to step S14005.

In step S14005, the CPU 4005 determines whether the operation done on the operation setting screen in step S14003 is input of an image editing command. If the CPU 4005 determines in step S14005 that the operation done in step S14003 is not input of an image editing command, the process proceeds to step S14006 where a process is executed in accordance with the input command, and then the process returns to step S14003.

If the CPU 4005 determines in step S14005 that the operation done in step S14003 is input of an image editing command, the process proceeds to step S14007. In step S14007, an image editing function identifier for identifying the image editing function specified on the operation screen in step S14003 and edit information about the editing function are generated. The generated identifier and edit information are stored in the image editing function identifier area 16002. This information is stored in the RAM 4006 by the CPU 4005, and then the process returns to step S14003. If the CPU 4005 determines in step S14004 that the operation done in step S14003 is input of a read starting command, the process proceeds to step S14008.

In step S14008, the document set on the document glass is read by controlling the scanner unit 3200 and the read image data is stored in the image data area 16004.

In step S14009, the CPU 4005 determines whether the image processing function set in step S14007 can be executed in the image processing apparatus 1002 based on the image processing function list shown in FIG. 10. If the CPU 4005 determines in step S14009 that the image processing function set in step S14007 can be executed in the image processing apparatus 1002, the process proceeds to step S14010. In step S14010, the image data, the image editing function identifier information, and the edit information about the image editing function are stored in the HDD 4011.

In step S14011, the resolution of the image data read in step S14008 is decreased. Then, the resolution information is stored in the image data resolution information area 16003 of the page data 16000, and the page data 16000 including the image data 16004 whose resolution has been decreased is transmitted to the image editing apparatus 1001 through the network I/F 4008. The page data transmitted to the image editing apparatus 1001 has the data format shown in FIG. 16.

In the page identification number area 16001, a page identification number specifying the image data obtained from the read document is stored. In the image editing function identifier area 16002, the image editing function identifier information and edit information generated based on the image processing function set in step S14007 are stored. In the image data resolution information area 16003, resolution information of the low-resolution image that was generated in the resolution converting process in step S14011 is stored. As the resolution information stored in the resolution information area 16003, an actual resolution value or flag information indicating a low resolution can be used. In the image data area 16004, low-resolution image data whose resolution has been converted is stored. Processing then proceeds to step S14013.

If the CPU 4005 determines in step S14009 that the image processing function set in step S14007 cannot be executed in the image processing apparatus 1002, the process proceeds to step S14012. In step S14012, the image data that was read in step S14008 (image data that has not been converted to low-resolution data) is stored in the image data area 16004 of the page data 16000. Then, the page identification number and the image editing function identifier information and edit information generated in step S14010 are added to this page data 16000, which is transmitted to the image editing apparatus 1001 through the network I/F 4008. Processing then proceeds to step S14013.

In step S14013, it is determined whether an unprocessed document exists on the scanner unit 3200. If it is determined in step S14013 that an unprocessed document exists on the scanner unit 3200, the process returns to step S14008 so as to read the unprocessed document. If it is determined that no unprocessed document exists on the scanner unit 3200, the document reading process in the image processing apparatus 1002 ends.

In the above-described process, the procedure varies depending on whether an image editing function to be executed on a document read by the image processing apparatus 1002 can be executed by the image processing apparatus 1002. If the image editing function is executable by the image processing apparatus 1002, the image editing is executed by the image processing apparatus 1002. In this case, real image data need not be transmitted to the image editing apparatus 1001 and the image editing apparatus 1001 need not perform image editing. In this case, low-resolution image data for preview is transmitted to the image editing apparatus 1001.

On the other hand, if the image editing cannot be executed by the image processing apparatus 1002, the image editing needs to be executed by the image editing apparatus 1001. In this case, real image data and specified edit information are transmitted to the image editing apparatus 1001.

Figure 15:
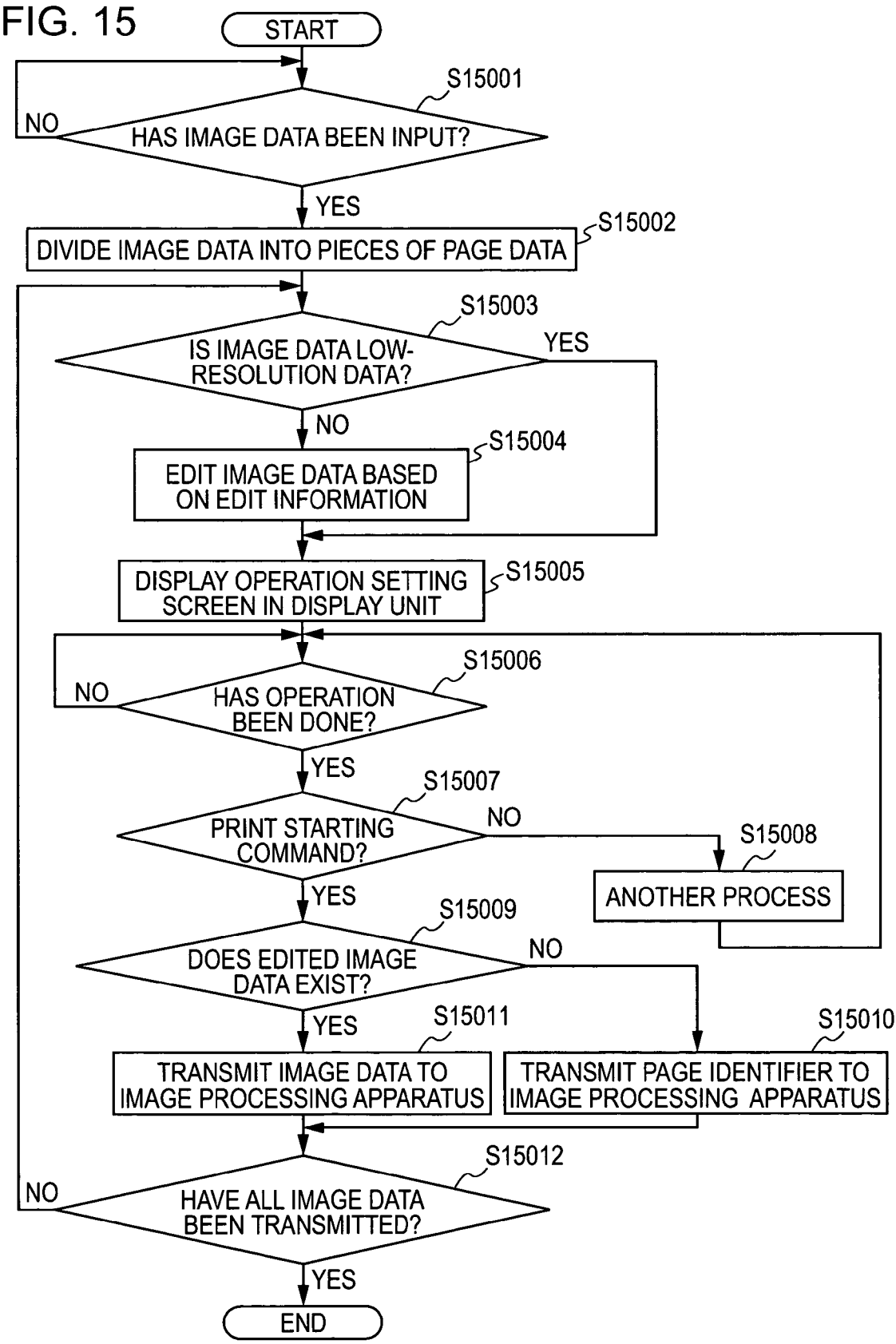
FIG. 15 is a flowchart showing the control in the image editing apparatus according to the second embodiment of the present invention.

FIG. 15 is a flowchart showing an image editing process that is executed on the image editing apparatus 1001 side after data is transmitted from the image processing apparatus 1002 to the image editing apparatus 1001 by the process shown in FIG. 14. This process is predominantly executed by the CPU 2002.

First, in step S15001, the CPU 2002 determines whether image data has been input from the image processing apparatus 1002 through the network communication unit 2006.

If the CPU 2002 determines in step S15001 that image data has been input from the image processing apparatus 1002, the process proceeds to step S15002. In step S15002, the CPU 2002 divides the input data into pieces of page data corresponding to respective pages. This step need not be executed if the data transmitted from the image processing apparatus 1002 is input in units of pages.

In step S15003, the CPU 2002 determines whether the image data included in each page data 16000 generated in the dividing step S15002 is low-resolution image data. The determination is made by obtaining resolution information that is stored in the image data resolution information area 16003 of the page data 16000.

If the CPU 2002 determines in step S15003 that the image data is low-resolution image data, the process proceeds to step S15005. If the CPU 2002 determines in step S1503 that the image data is not low-resolution image data, the process proceeds to step S15004.

In step S15004, the image data included in the page data 16000 is edited based on the identifier and edit information stored in the image editing function identifier area 16002 of the page data 16000.

In this process, whether the image data is low-resolution image data is determined, and if the image data is not low-resolution image data, the image data is edited. Since the image data to be edited is equivalent to image data of a real resolution, the image data to be edited can be easily identified by referring to resolution information.

However, in the present invention, the above-described determination is not necessarily done based on the resolution information. For example, when image data is attached with information indicating whether or not the image data is to be edited, the CPU 2002 of the image editing apparatus 1001 determines whether the image data is attached with information indicating that the image data is to be edited. If the information is attached to the image data, image editing is executed in step S15004. That is, in the present invention, it should be determined whether the image data input to the image editing apparatus 1001 is image data to be edited in the image editing apparatus 1001. Processing then proceeds to step S15005.

In step S15005, the CPU 2002 displays an operation setting screen in the display unit 2009 so that the operator can provide various instructions for the image data input to the image editing apparatus 1001.

In step S15006, the CPU 2002 determines whether an operation has been done on the operation setting screen, which was displayed in the display unit 2009 in step S15005. If the CPU 2002 determines in step S15006 that an operation has been done on the operation setting screen, the process proceeds to step S15007.

In step S15007, the CPU 2002 determines whether the operation done on the operation setting screen is input of a print starting command. If the CPU 2002 determines in step S15007 that the operation is not input of a print starting command, the process proceeds to step S15008 to execute a process according to the input command. Then the process returns to step S15006.

If the CPU 2002 determines in step S15007 that the command input through the operation unit is about image editing and if the image data to be edited is real-resolution data (image data that has not been converted to low-resolution data), steps S12007, S12008, and S12009 shown in FIG. 12 area executed. That is, depending on whether the editing function specified through the operation unit can be executed in the image processing apparatus 1002, it is determined whether the image data should be edited in the image editing apparatus 1001 or the image data should be edited in the image processing apparatus 1002 by generating edit information.

On the other hand, if the image data to be edited is low-resolution data, it is determined whether the editing function specified through the operation unit can be executed only in the image editing apparatus 1001. If the editing function can be edited only in the image editing apparatus 1001, real image data corresponding to the low-resolution data is obtained from the image processing apparatus 1002 and then the obtained real image data is edited. At this time, the obtained real image data has already been edited with an editing function that can be executed in the image processing apparatus 1002 (see the flowchart shown in FIG. 14). Therefore, the image editing apparatus 1001 needs to also execute the image editing that has been executed, so that the image editing apparatus 1001 needs to obtain information about the already executed image editing as well as real image data.

If the editing function specified through the operation unit can be executed in the image processing apparatus 1002, the image editing apparatus 1001 does not need to execute the editing function. Therefore, the image editing apparatus 1001 generates image edit information by executing the same step as step S12008 shown in FIG. 12 and the image edit information is transmitted to the image processing apparatus 1002. Accordingly, the image processing apparatus 1002 executes the editing process.

If the CPU 2002 determines in step S15007 that the operation is input of a print starting command, the process proceeds to step S15009. In step S15009, the CPU 2002 determines whether the page data to be processed includes image data that has been edited in the image editing apparatus 1001. In other words, whether image data edited in the image editing apparatus 1001 exists is determined. If the image data transmitted from the image processing apparatus 1002 is real-resolution image data, that means image editing has been done in a previous step. Therefore, edited image data needs to be transmitted to the image processing apparatus 1002. Then, it is determined whether the image data included in the page data to be processed is the image data that has been edited in the image editing apparatus 1001.

If it is determined in step S15009 that the image data edited in the image editing apparatus 1001 does not exist, the process proceeds to step S15010. This means that the image data included in the page data 16000 is low-resolution image data or image data to be edited with an editing function that is executable in the image processing apparatus 1002. In step S15010, page identification information, editing function identifier information, and edit information are transmitted to the image processing apparatus 1002 through the network communication unit 2006 but the image data is not transmitted thereto. Processing then proceeds to step S15012.

If it is determined in step S15009 that the image data edited in the image editing apparatus 1001 exists, the process proceeds to step S15011. In step S15011, the page identifier information and the image data are transmitted to the image processing apparatus 1002 through the network communication unit 2006. Processing then proceeds to step S15012.

In step S15012, the CPU 2002 determines whether there exists image data that has not been transmitted to the image processing apparatus 1002.

If the CPU 2002 determines in step S15012 that there exists image data that has not been transmitted to the image processing apparatus 1002, the process returns to step S15003. If the CPU 2002 determines in step S15012 that all image data have been transmitted to the image processing apparatus 1002, the process in the image editing apparatus 1001 ends.

Then, the image processing apparatus 1002 prints the image data transmitted in the flowchart shown in FIG. 15 in accordance with the flowchart shown in FIG. 13 of the first embodiment.

As described above, in this embodiment, an editing function to be executed is specified on the image processing apparatus 1002 side. If the specified editing function can be executed in the image processing apparatus 1002, real image data obtained by reading a document is not transmitted to the image editing apparatus 1001. Accordingly, the amount of transmitted data can be reduced compared to the first embodiment, which significantly contributes to enhance the throughput.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-367837 filed Dec. 20, 2004 and Japanese Application No. 2005-300355 filed Oct. 14, 2005, which are hereby incorporated by reference herein in their entirety.

What is claimed is:

1. An image processing system comprising:
an image forming apparatus; and
an image editing apparatus,
the image forming apparatus comprising:
an input unit adapted to input image data;
a storage unit adapted to store the image data input by the input unit in a memory; and
a first transmitting unit adapted to transmit the image data input by the input unit to the image editing apparatus,
the image editing apparatus comprising:
a first receiving unit adapted to receive the image data transmitted by the first transmitting unit from the image forming apparatus;
an indication unit adapted to indicate an image editing process to be executed on the image data received by the first receiving unit;
a first image editing unit adapted to execute the image editing process indicated by the indication unit on the image data received by the first receiving unit; and
a second transmitting unit adapted to transmit print data including the image data on which the image editing process is executed by the first image editing unit to the image forming apparatus in a case where the image editing process indicated by the indication unit is inexecutable in the image forming apparatus, and to transmit print data not including the image data on which the image editing process is executed by the first image editing unit but including identification information representing the image data received by the first receiving unit and edit information representing the image editing process indicated by the indication unit to the image forming apparatus in a case where the image editing process indicated by the indication unit is executable in the image forming apparatus, and
the image forming apparatus further comprising:
an input unit adapted to input image data a second receiving unit adapted to receive the print data transmitted by the second transmitting unit;
a second image editing unit adapted to execute the image editing process represented by the edit information on the image data represented by the identification information among the image data stored in the memory in a case where the print data received by the second receiving unit does not include the image data on which the image editing process is executed by the first image editing unit but includes the identification information and the edit information; and
an output unit adapted to output the image data on which the image editing process is executed by the first image editing unit in a case where the print data received by the second receiving unit includes the image data on which the image editing process is executed by the first image editing unit, and to output the image data on which the image editing process is executed by the second image editing unit in a case where the print data received by the second receiving unit does not include the image data on which the image editing process is executed by the first image editing unit but includes the identification information and the edit information.

2. The image processing system according to claim 1, wherein the first image editing unit executes the image editing process indicated by the indication unit on the image data received by the first receiving unit in a case where the image editing process indicated by the indication unit is inexecutable in the image forming apparatus, and the image editing unit does not execute the image editing process indicated by the indication unit on the image data received by the first receiving unit in a case where the image editing process indicated by the indication unit is executable in the image forming apparatus.

3. The image processing system according to claim 1, wherein the first image editing unit executes the image editing process indicated by the indication unit on the image data received by the first receiving unit, whether the image editing process indicated by the indication unit is executable or inexecutable in the image forming apparatus.

4. The image processing system according to claim 1, wherein the input unit inputs the image data by reading a document.

5. The image processing system according to claim 1, wherein the output unit output the image data by executing a printing process based on the print data.

6. The image processing system according to claim 1, wherein, in a case where the indication unit indicates a plurality of types of image editing processes and all of the plurality of types of image editing processes indicated by the indication unit are executable in the image forming apparatus, the first image editing unit does not execute any of the plurality of types of image editing processes indicated by the indication unit on the image data received by the first receiving unit.

7. The image processing system according to claim 1, wherein, in a case where the indication unit indicates a plurality of types of image editing processes and some of the plurality of types of image editing processes indicated by the indication unit are inexecutable in the image forming apparatus, the first image editing unit executes all of the plurality of types of image editing processes indicated by the indication unit on the image data received by the first receiving unit.

8. The image processing system according to claim 1, wherein, in a case where the indication unit indicates a plurality of types of image editing processes and some of the plurality of types of image editing processes indicated by the indication unit are inexecutable in the image forming apparatus, the first image editing unit executes only the types of image editing processes inexecutable in the image forming apparatus out of the plurality of types of image editing processes indicated by the indication unit on the image data received by the first receiving unit.

9. The image processing system according to claim 1, wherein, in a case where the indication unit indicates a plurality of types of image editing processes and none of the plurality of types of image editing processes indicated by the indication unit are executable in the image forming apparatus, the first image editing unit executes all of the plurality of types of image editing processes indicated by the indication unit on the image data received by the first receiving unit.

10. An image editing apparatus capable of communicating with an image forming apparatus,
the image forming apparatus comprising:
an input unit adapted to input image data;
a storage unit adapted to store the image data input by the input unit in a memory; and
a first transmitting unit adapted to transmit the image data input by the input unit to the image editing apparatus,
the image editing apparatus comprising:
a first receiving unit adapted to receive the image data transmitted by the first transmitting unit from the image forming apparatus;
an indication unit adapted to indicate an image editing process to be executed on the image data received by the first receiving unit;
a first image editing unit adapted to execute the image editing process indicated by the indication unit on the image data received by the first receiving unit; and
a second transmitting unit adapted to transmit print data including the image data on which the image editing process is executed by the first image editing unit to the image forming apparatus in a case where the image editing process indicated by the indication unit is inexecutable in the image forming apparatus, and to transmit print data not including the image data on which the image editing process is executed by the first image editing unit but including identification information representing the image data received by the first receiving unit and edit information representing the image editing process indicated by the indication unit to the image forming apparatus in a case where the image editing process indicated by the indication unit is executable in the image forming apparatus, and
the image forming apparatus further comprising:
a second receiving unit adapted to receive the print data transmitted by the second transmitting unit;
a second image editing unit adapted to execute the image editing process represented by the edit information on the image data represented by the identification information among the image data stored in the memory in a case where the print data received by the second receiving unit does not include the image data on which the image editing process is executed by the first image editing unit but includes the identification information and the edit information, and
an output unit adapted to output the image data on which the image editing process is executed by the first image editing unit in a case where the print data received by the second receiving unit includes the image data on which the image editing process is executed by the first image editing unit, and to output the image data on which the image editing process is executed by the second image editing unit in a case where the print data received by the second receiving unit does not include the image data on which the image editing process is executed by the first image editing unit but includes the identification information and the edit information.

11. An image forming apparatus capable of communicating with an image editing apparatus,
the image forming apparatus comprising:
an input unit adapted to input image data;
a storage unit adapted to store the image data input by the input unit in a memory; and
a first transmitting unit adapted to transmit the image data input by the input unit to the image editing apparatus,
the image editing apparatus comprising:
a first receiving unit adapted to receive the image data transmitted by the first transmitting unit from the image forming apparatus;
an indication unit adapted to indicate an image editing process to be executed on the image data received by the first receiving unit;
a first image editing unit adapted to execute the image editing process indicated by the indication unit on the image data received by the first receiving unit; and
a second transmitting unit adapted to transmit print data including the image data on which the image editing process is executed by the first image editing unit to the image forming apparatus in a case where the image editing process indicated by the indication unit is inexecutable in the image forming apparatus, and to transmit print data not including the image data on which the image editing process is executed by the first image editing unit but including identification information representing the image data received by the first receiving unit and edit information representing the image editing process indicated by the indication unit to the image forming apparatus in a case where the image editing process indicated by the indication unit is executable in the image forming apparatus, and
the image forming apparatus further comprising:
a second receiving unit adapted to receive the print data transmitted by the second transmitting unit;
a second image editing unit adapted to execute the image editing process represented by the edit information on the image data represented by the identification information among the image data stored in the memory in a case where the print data received by the second receiving unit does not include the image data on which the image editing process is executed by the first image editing unit but includes the identification information and the edit information, and
an output unit adapted to output the image data on which the image editing process is executed by the first image editing unit in a case where the print data received by the second receiving unit includes the image data on which the image editing process is executed by the first image editing unit, and to output the image data on which the image editing process is executed by the second image editing unit in a case where the print data received by the second receiving unit does not include the image data on which the image editing process is executed by the first image editing unit but includes the identification information and the edit information.

12. A control method for an image processing system including an image forming apparatus and an image editing apparatus, the control method comprising:

controlling the image forming apparatus, including:
   an input step of inputting image data;
   a storing step of storing the image data input in the input step in a memory; and
   a first transmitting step of transmitting the image data input in the input step to the image editing apparatus, controlling the image editing apparatus, including:
   a first receiving step of receiving the image data transmitted in the first transmitting step from the image forming apparatus;
   an indication step of indicating an image editing process to be executed on the image data received in the first receiving step;
   a first image editing step of executing the image editing process indicated in the indication step on the image data received in the first receiving step; and
   a second transmitting step of transmitting print data including the image data on which the image editing process is executed in the first image editing step to the image forming apparatus in a case where the image editing process indicated in the indication step is inexecutable in the image forming apparatus, and of transmitting print data not including the image data on which the image editing process is executed in the first image editing step but including identification information representing the image data received in the first receiving step and edit information representing the image editing process indicated in the indication step to the image forming apparatus in a case where the image editing process indicated in the indication step is executable in the image forming apparatus, and the controlling the image forming apparatus further comprising:
   a second receiving step of receiving the print data transmitted in the second transmitting step;
   a second image editing step of executing the image editing process represented by the edit information on the image data represented by the identification information among the image data stored in the memory in a case where the print data received in the second receiving step does not include the image data on which the image editing process is executed in the first image editing step but includes the identification information and the edit information, and
   an output step of outputting the image data on which the image editing process is executed in the first image editing step in a case where the print data received in the second receiving step includes the image data on which the image editing process is executed in the first image editing step, and of outputting the image data on which the image editing process is executed in the second image editing step in a case where the print data received in the second receiving step does not include the image data on which the image editing process is executed in the first image editing step but includes the identification information and the edit information.

* * * * *